US011478681B2

(12) United States Patent
Kantorovich et al.

(10) Patent No.: US 11,478,681 B2
(45) Date of Patent: Oct. 25, 2022

(54) METHOD OF REAL TIME MONITORING OF A PERSON DURING AN EVENT AND EVENT DYNAMICS SYSTEM THEREOF

(71) Applicant: AGT GLOBAL MEDIA GMBH, Zurich (CH)

(72) Inventors: Aleksandr Kantorovich, Darmstadt (DE); Kai Chen, Darmstadt (DE); Grigory Alexandrovich, Rossdorf (DE); Matania Zvi Kochavi, Caesarea (IL); Joachim Schaper, Heusenstamm (DE)

(73) Assignee: AGT GLOBAL MEDIA GMBH, Zurich (CH)

( * ) Notice: Subject to any disclaimer, the term of this patent is extended or adjusted under 35 U.S.C. 154(b) by 131 days.

(21) Appl. No.: 16/767,824

(22) PCT Filed: Nov. 29, 2018

(86) PCT No.: PCT/IL2018/051309
§ 371 (c)(1),
(2) Date: May 28, 2020

(87) PCT Pub. No.: WO2019/106672
PCT Pub. Date: Jun. 6, 2019

(65) Prior Publication Data
US 2021/0001174 A1    Jan. 7, 2021

Related U.S. Application Data

(60) Provisional application No. 62/591,966, filed on Nov. 29, 2017, provisional application No. 62/591,977, filed on Nov. 29, 2017.

(51) Int. Cl.
*A63B 24/00* (2006.01)
*A63B 71/06* (2006.01)
*A63B 69/00* (2006.01)

(52) U.S. Cl.
CPC ...... *A63B 24/0062* (2013.01); *A63B 71/0622* (2013.01); *A63B 69/002* (2013.01);
(Continued)

(58) Field of Classification Search
CPC .................................................. A63B 24/0024
See application file for complete search history.

(56) References Cited

U.S. PATENT DOCUMENTS 6,611,782 B1    8/2003    Wooster et al.
6,925,851 B2    8/2005    Reinbold et al.
(Continued)

FOREIGN PATENT DOCUMENTS

EP    2926877 A2    10/2015
WO    2016/170194 A1    10/2016

OTHER PUBLICATIONS fightland.vice.com/blog/circus-circus-a-recap-of-yesterdays-nsac-hearing (Feb. 18, 2015).

*Primary Examiner* — Kesha Frisby
(74) *Attorney, Agent, or Firm* — Browdy and Neimark, PLLC

(57) ABSTRACT

A method of monitoring at least one person in an event, comprises providing at least one sensor associated with the person, measuring data using the at least one sensor, wherein the measured data includes data representative of a motion of at least one part of the person's body, the method further comprising, by a processing unit based at least on said data, determining at least one insight, wherein said insight is characteristic of at least one of (a) an action performed by the person in the event and (b) an event situation, thereby facilitating characterization of at least one of the person and the event.

20 Claims, 11 Drawing Sheets

(52) U.S. Cl.
CPC ......... *A63B 69/004* (2013.01); *A63B 69/0071* (2013.01); *A63B 2024/0096* (2013.01); *A63B 2071/0647* (2013.01); *A63B 2220/05* (2013.01); *A63B 2220/30* (2013.01); *A63B 2220/53* (2013.01); *A63B 2220/56* (2013.01); *A63B 2220/803* (2013.01); *A63B 2220/806* (2013.01); *A63B 2220/836* (2013.01)

(56) References Cited

U.S. PATENT DOCUMENTS

| | | |
|---|---|---|
| 7,171,331 B2 | 1/2007 | Vock |
| 7,174,277 B2 | 2/2007 | Vock |
| 7,353,136 B2 | 4/2008 | Vock et al. |
| 7,353,137 B2 | 4/2008 | Vock et al. |
| 7,384,380 B2 | 6/2008 | Reinbold et al. |
| 7,552,031 B2 | 6/2009 | Vock et al. |
| 7,620,520 B2 | 11/2009 | Vock et al. |
| 7,627,451 B2 | 12/2009 | Vock et al. |
| 7,856,339 B2 | 12/2010 | Vock et al. |
| 8,126,675 B2 | 2/2012 | Vock et al. |
| 8,221,291 B1 | 7/2012 | Kantarevic et al. |
| 8,280,681 B2 | 10/2012 | Vock et al. |
| 8,280,682 B2 | 10/2012 | Vock et al. |
| 8,374,825 B2 | 2/2013 | Vock et al. |
| 8,396,687 B2 | 3/2013 | Vock et al. |
| 8,428,904 B2 | 4/2013 | Vock et al. |
| 8,622,795 B2 | 1/2014 | Edis et al. |
| 8,638,236 B2 | 1/2014 | Chen et al. |
| 8,660,814 B2 | 2/2014 | Vock et al. |
| 8,688,406 B2 | 4/2014 | Vock et al. |
| 9,120,014 B2 | 9/2015 | Vock et al. |
| 9,257,054 B2 | 2/2016 | Coza et al. |
| 9,267,793 B2 | 2/2016 | Vock |
| 9,504,414 B2 | 11/2016 | Coza et al. |
| 9,643,091 B2 | 5/2017 | Vock et al. |
| 9,737,261 B2 | 8/2017 | Coza et al. |
| 2006/0047447 A1 | 3/2006 | Brady et al. |
| 2010/0144414 A1 | 6/2010 | Edis |
| 2013/0274635 A1 | 10/2013 | Coza et al. |
| 2013/0274904 A1 | 10/2013 | Coza et al. |
| 2014/0228156 A1 | 8/2014 | Riggle et al. |
| 2015/0224362 A1 | 8/2015 | Rishi et al. |
| 2015/0360080 A1 | 12/2015 | Hadaschik et al. |
| 2016/0175683 A1 | 6/2016 | Migliorati et al. |
| 2016/0263458 A1 | 9/2016 | Mather et al. |
| 2017/0086519 A1 | 3/2017 | Vigano' |
| 2017/0157488 A1 | 6/2017 | Migliorati et al. |

METHOD OF REAL TIME MONITORING OF A PERSON DURING AN EVENT AND EVENT DYNAMICS SYSTEM THEREOF

TECHNICAL FIELD

The presently disclosed subject matter relates to monitoring of behaviour of a person during an event, and, more particularly, to real time monitoring of athletes during a sports event, such as a martial arts event.

BACKGROUND

Known techniques may use cameras and image processing techniques for detecting motion of a person in an event. Obtaining information on a person's performance during a certain event is often required.

GENERAL DESCRIPTION

In accordance with certain aspects of the presently disclosed subject matter, there is provided a method of monitoring at least one person in an event, comprising providing at least one sensor, measuring data using the at least one sensor, wherein the measured data includes data representative of a motion of at least one part of the person's body, the method further comprising, by a processing unit, based at least on said data, determining at least one insight, wherein said insight is characteristic of at least one of an action performed by the person in the event, and an event situation, thereby facilitating characterization of at least one of the person and the event.

In addition to the above features, the method according to this aspect of the presently disclosed subject matter can optionally comprise one or more of features (i) to below, in any technically possible combination or permutation:
  i. the sensor comprises at least one of a sensor located on a part of the person's body, a sensor located on a tool or item or piece of clothing carried by the person in the event, a sensor located in gloves of the person in the event, a video sensor providing an image of the person in the event, and a pressure sensor located on a ground surface of the event;
  ii. the event is a martial arts event and the person is a fighter, wherein determining said insight comprises, based at least on said data, detecting an attack performed by said fighter;
  iii. determining said insight comprises determining, based at least on said data, a type of the attack performed by said fighter.
  iv. determining said insight comprises determining, based at least on said data, whether said attack corresponds to a hit, a missed attack, or a blocked attack.
  v. determining said insight comprises determining, based at least on said data, at least one of a strength of the attack, a speed of the attack, and an impact zone of the attack;
  vi. the event is a soccer event and the person is a player, wherein the method comprises, based at least on said data, determining an insight representative of tackling, dribbling, shooting or miming by said player; or the event is a basketball event and the person is a player, wherein determining said insight comprises, based at least on said data, determining an insight representative of jumping, dribbling, shooting or running by said player;
  vii. the event is characterizable by a list comprising different event situations, wherein the method comprises, by a processing unit, based at least on said data measured by said sensor, determining an event situation among said list;
  viii. the event is a martial arts event, wherein the method comprises, by a processing unit, determining a fight situation among at least one of ground fight, clinch fight and distance fight;
  ix. the event is a soccer event, wherein the method comprises, by a processing unit, determining a soccer situation among at least one of attack phase, ball holding phase, penalty shots phase; or the event is a bask-ball event, wherein the method comprises, by a processing unit, determining a soccer situation among at least one of attack phase, ball holding phase, free shots phase, the method comprises determining one or more insights over a period of time for said person, and building, by the processing unit, a profile characterizing behavior of said person based at least on said insights;
  x. the method comprises by the processing unit, at least one of determining an insight representative of interactions of at least another person with the person, determining an insight indicative of an offensiveness of the person, determining an insight indicative of an environment of the person, determining an insight representative of a physical condition of the person, and determining an insight representative of emotions of the person;
  xi. the method comprises displaying data representative of the insight, thereby providing a visual characterization of at least one of the person and the event; and
  xii. the method comprises, by the processing unit, providing an avatar representative of the person in a simulation, animating said avatar in said simulation based at least on a motion of said person in the event, and modifying a visual representation of said avatar or of said simulation based on said at least one insight.

According to another aspect of the presently disclosed subject matter there is provided a method comprising providing at least one sensor, measuring data using the at least one sensor, wherein the measured data includes data representative of a motion of at least one part of the person's body, the method further comprising, by a processing unit, based at least on said data, determining at least one insight, wherein said insight is characteristic of at least one of an action performed by the person in the event, and an event situation, providing an avatar representative of the person in a simulation, animating said avatar in said simulation based at least on a motion of said person in the event, wherein the method comprises applying at least one multimedia effect on said avatar or on said simulation reflecting said insight, thereby providing an output characterizing said person or said event.

In addition to the above features, the method according to this aspect of the presently disclosed subject matter can optionally comprise one or more of features (xiv) to (xvii) below, in any technically possible combination or permutation:
  xiii. the method comprises by the processing unit, providing a baseline model for said avatar; based on a motion of said person in the event, and on said insight, modifying accordingly said baseline model to reflect said motion and said insight;
  xiv. said modifying is based on an algorithm receiving, as an input, at least said insight and one or more parameters of said insight, and which provides, as an output, at least one multimedia effect and associated one or more parameters to be applied to at least said baseline model;

xv. said multimedia effect comprises at least one of modifying at least one of a size, color, and face of the avatar based on an insight representative of a behavior of said person with respect to another person in said event, applying a visual effect on a body part of the avatar based on an insight representative of said body part, and displaying an animation on the avatar which varies overtime; and xvi. the method comprises determining one or more insights over a period of time for said person, building, by a processing unit, a profile characterizing behavior of said person based on said one or more insights, and generating an avatar which has parameters which complies with said profile, thereby allowing use of said avatar in a simulation.

According to another aspect of the presently disclosed subject matter there is provided a system for monitoring at least one person in an event, comprising a processing unit configured to obtain data measured by at least one sensor, wherein the measured data includes data representative of a motion of at least one part of the person's body; based at least on said data, determine at least one insight, wherein said insight is characteristic of at least one of an action performed by the person in the event and an event situation, thereby facilitating characterization of at least one of the person and the event.

In addition to the above features, the system according to this aspect of the presently disclosed subject matter can optionally comprise one or more of features (xviii) to (xxx) below, in any technically possible combination or permutation:

xvii. the sensor comprises at least one of a sensor located on a part of the person's body, a sensor located on a tool or item or piece of clothing carried by the person in the event, a sensor located in gloves of the person in the event, a video sensor providing an image of the person in the event, and a pressure sensor located on a ground surface of the event;

xviii. the event is a martial arts event and the person is a fighter, wherein determining said insight comprises, based at least on said data, detecting an attack performed by said fighter;

xix. determining said insight comprises determining, based at least on said data, a type of the attack performed by said fighter;

xx. determining said insight comprises determining, based at least on said data, whether said attack corresponds to a hit, a missed attack, or a blocked attack;

xxi, determining said insight comprises determining, based at least on said data, at least one of a strength of the attack, a speed of the attack, an impact zone of the attack;

xxii. the event is a soccer event and the person is a player, wherein the system is configured to determine, based at least on said data, an insight representative of tackling, dribbling, shooting or miming by said player; or the event is a basketball event and the person is a player, wherein the system is configured to determine, based at least on said data, an insight representative of jumping, dribbling, shooting or running by said player.

xxiii. the event is characterizable by a list comprising different event situations, wherein the system is configured to, by the processing unit, based at least on said data measured by said sensor, determine an event situation among said list;

xxiv. the event is a martial arts event, wherein the system is configured to, by a processing unit, determine a fight situation among at least one of ground fight, clinch fight and distance fight;

xxv. the event is a soccer event, wherein the system is configured to, by a processing unit, determine a soccer situation among at least one of attack phase, ball holding phase, penalty shots phase; or the event is a bask-ball event, wherein the system is configured to, by a processing unit, determine a soccer situation among at least one of attack phase, ball holding phase, free shots phase;

xxvi. the system is configured to determine one or more insights over a period of time for said person, and build, by a processing unit, a profile characterizing behavior of said person based at least on said insights;

xxvii. the system is configured to determine, by a processing unit, at least one of an insight representative of interactions of at least another person with the person, an insight indicative of an offensiveness of the person, an insight indicative of an environment of the person, an insight representative of a physical condition of the person, and an insight representative of emotions of the person;

xxviii. the system is configured to display data representative of the insight, thereby providing a visual characterization of at least one of the person and the event;

xxix. the system is configured to, by a processing unit, provide an avatar representative of the person in a simulation, animate said avatar in said simulation based at least on a motion of said person in the event, and modify a visual representation of said avatar or of said simulation based on said at least one insight;

According to another aspect of the presently disclosed subject matter there is provided a system, configured to, by a processing unit, obtain at least one insight, wherein said insight is characteristic of at least one of an action performed by a person in an event, and an event situation, provide an avatar representative of the person in a simulation, animate said avatar in said simulation based at least on a motion of said person in the event, and apply at least one multimedia effect on said avatar or on said simulation reflecting said insight, thereby providing an output characterizing said person or said event.

In addition to the above features, the system according to this aspect of the presently disclosed subject matter can optionally comprise one or more of features (xxxi) to (xxxiv) below, in any technically possible combination or permutation:

xxx. the system is configured to, by the processing unit, provide a baseline model for said avatar, and based on a motion of said person in the event, and on said insight, modify accordingly said baseline model to reflect said motion and said insight;

xxxi. said modifying is based on an algorithm receiving, as an input, at least said insight and one or more parameters of said insight, and which provides, as an output, at least one multimedia effect and associated parameters to be applied at least to said baseline model;

xxxii. said multimedia effect comprises at least one of modifying at least one of a size, color, and face of the avatar based on an insight representative of a behavior of said person with respect to another person in said event; applying a visual effect on a body part of the avatar based on an insight representative of said body part, and displaying an animation on the avatar which varies over time;

xxxiii. the system is configured to determine one or more insights over a period of time for said person, build, by a processing unit, a profile characterizing behavior of said person based on said one or more insights, and generate an avatar which has parameters which complies with said profile, thereby allowing use of said avatar in a simulation.

According to another aspect of the presently disclosed subject matter there is provided a non-transitory storage device readable by a machine, tangibly embodying a program of instructions executable by the machine to perform a method of monitoring at least one person in an event, the method comprising obtaining data measured by at least one sensor, which includes data representative of a motion of at least one part of the person's body; based at least on said data, determining at least one insight, wherein said insight is characteristic of at least one of an action performed by the person in the event and an event situation, thereby facilitating characterization of at least one of the person and the event.

In addition to the above features, the non-transitory storage device according to this aspect of the presently disclosed subject matter can optionally perform a method comprising one or more of features (i) to (xiii) above, in any technically possible combination or permutation.

According to another aspect of the presently disclosed subject matter there is provided a non-transitory storage device readable by a machine, tangibly embodying a program of instructions executable by the machine to perform a method comprising obtaining data measured by at least one sensor, which includes data representative of a motion of at least one part of the person's body, based at least on said data, determining at least one insight, wherein said insight is characteristic of at least one of an action performed by the person in the event and an event situation, providing an avatar representative of the person in a simulation, animating said avatar in said simulation based at least on a motion of said person in the event, wherein the method comprises applying at least one multimedia effect on said avatar or on said simulation reflecting said insight, thereby providing an output characterizing said person or said event.

In addition to the above features, the non-transitory storage device according to this aspect of the presently disclosed subject matter can optionally perform a method comprising one or more of features (xiv) to (xvii) above, in any technically possible combination or permutation.

According to some embodiments, the proposed solution allows determining, in real time, or quasi real time, insights representative of a person participating in an event (such as athletes during a sports event).

According to some embodiments, the proposed solution allows in-depth characterization and analysis of a behaviour of a person during an event (such as athletes during a sports event).

According to some embodiments, the proposed solution allows classification of behaviour of a person during an event, based on various data collected from sensors mounted on the person and/or located in the area of the event (e.g. sports event).

According to some embodiments, the proposed solution allows determining actions performed by athletes based on data collected from various sensors, assessing whether these actions are successful in this sport, and to what extent these actions are successful, thereby providing in-depth output of athletes' performance.

According to some embodiments, the proposed solution allows enriching broadcasting of an event (e.g. sports event), by outputting various insights representative of the event or persons (e.g. athletes) involved in the event.

According to some embodiments, the proposed solution provides output of insights representative of athletes' performance which can be used to enhance judging process.

According to some embodiments, the proposed solution provides output of an innovative simulation representative of persons participating in an event.

According to some embodiments, the simulation reflects actual behaviour of the persons (e.g. athletes) and is enriched by insights determined based on various data collected on the persons and/or in the event area.

According to some embodiments, the simulation generates multimedia (e.g. audio and/or visual) effects superimposed on avatars representative of the persons, thereby offering a quasi-real time and augmented display of persons participating in an event.

According to some embodiments, a profile characteristic of the person in one or more events is generated, thereby allowing generation of a virtual avatar which behaves in accordance with the profile of the real person, for e.g. a virtual game or simulation. The avatar therefore represents more accurately the real person over time.

Complex data from multiple sensor sources are highly dimensional and are hard for human end-users to interpret. Certain embodiments transform those insights into a visual representation far more palatable to the perceiver of the results who is typically not a data expert, but a layman.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "providing", "indicating", "transmitting", "determining", "animating", "building", "displaying", "outputting", "modifying", "processing" or the like, refer to the action(s) and/or process(es) of a processing unit that manipulate and/or transform data into other data, said data represented as physical, such as electronic, quantities and/or said data representing the physical objects.

The term "processing unit" covers any computing unit or electronic unit with data processing circuitry that may perform tasks based on instructions stored in a memory, such as a computer, a server, a chip, a processor, a hardware processor, etc. It encompasses a single processor or multiple processors, which may be located in the same geographical zone or may, at least partially, be located in different zones and may be able to communicate together.

The terms "non-transitory memory" and "non-transitory storage medium" used herein should be expansively construed to cover any volatile or non-volatile computer memory suitable to the presently disclosed subject matter.

It is to be understood that the term "signal" used herein excludes transitory propagating signals, but includes any other signal suitable to the presently disclosed subject matter.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The operations in accordance with the teachings herein may be performed by a computer specially constructed for the desired purposes or by a general-purpose computer specially configured for the desired purpose by a computer program stored in a non-transitory computer-readable storage medium.

Figure 1:
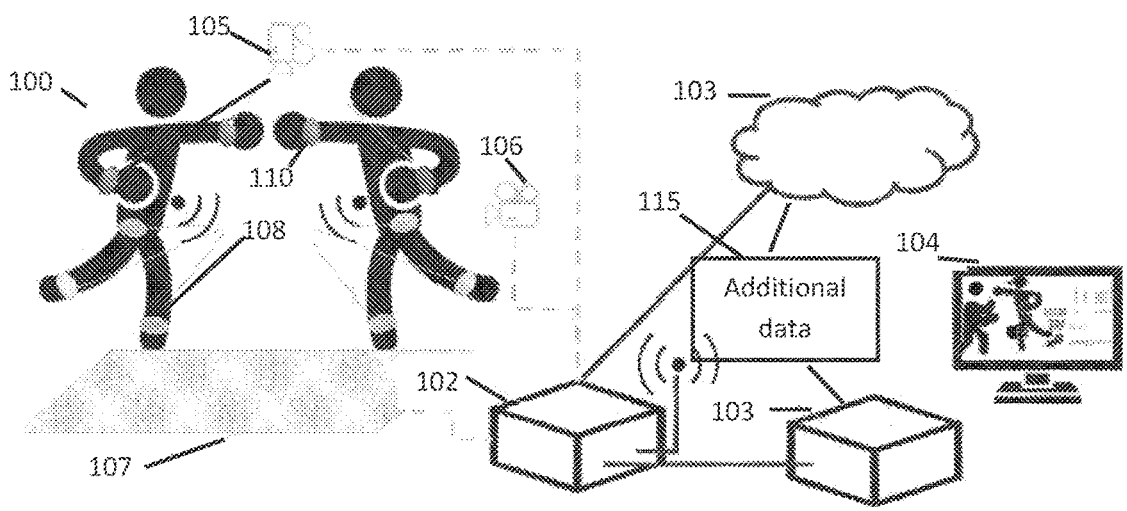
FIG. 1 illustrates a functional block diagram of a high-level system setup in accordance with certain embodiments of the presently disclosed subject matter.

Bearing this in mind, attention is drawn to FIG. 1 which illustrates a functional block diagram of a high-level system setup in accordance with certain embodiments of the presently disclosed subject matter.

FIG. 1 is depicted with reference to a martial arts event, with two persons currently involved in a fight. This is however not limitative and the system can be used for other sports events (basketball, soccer, etc.) which may include various players, or a single player located in a sports area. Moreover, the system can be used for other events in which motion of moving elements (such as humans, animals, etc.) present in an area is to be characterized, as explained hereinafter.

The system (see FIG. 1) can include (and/or is operatively connected to) one or more sensors 100.

The sensors 100 can include e.g. one or more sensors 110 located on the person himself. In particular, sensors 110 can be associated with at least one part of the person's body.

According to some embodiments, sensors 110 can be attached to:
  at least one part of the person's body (for example a sensor affixed to a limb of the person's body, see e.g. IMU sensors 108 on fighters' waists and legs), and/or
  at least one item of clothing worn by the person, or at least one tool or sports item carried by the person (for example one IMU sensor in each glove of each fighter, etc.).

Sensors which are associated with at least one part of the person's body can provide data representative of this part, in particular of its motion (for example a sensor in gloves can provide data representative of the motion of the arm of a fighter).

Sensors 110 can include e.g. IMU sensors, position sensor, velocity sensor, acceleration sensor, force sensor, pressure sensor, physiological sensors (e.g. heartbeat sensor, temperature sensor), bio-chemical sensor (e.g. blood lactate sensor, etc.), etc.

In some examples, each sensor 110 can include an accelerometer, gyroscope, magnetometer, microprocessor and wireless transceiver. Sensors 110 measure e.g. acceleration and angular velocity of the limb or element to which they are affixed. In some examples, the microprocessor preprocesses and corrects the measurements based on data from magnetometer. Common techniques for preprocessing data can be found in the prior art.

According to some embodiments, sensors 100 can include one or more sensors which are located in or around the area in which the person is located.

For example, these sensors can include:
  one or more sensors attached to an object carried temporarily by the person (for example a ball in a basketball game, etc.) and/or displaced by the person (for example a ball in a soccer game). The sensors can include e.g. position sensor, velocity sensor, acceleration sensor, force sensor, pressure sensor, IMU sensor, etc.;
  one or more sensors located in or around the area (e.g. sports area), such as one or more cameras (e.g. depth cameras 105 installed above the area, and/or video cameras 106 installed above or on the side of sports area), one or more audio sensors, one or more temperature sensors, one or more pressure sensors (for example, pressure mat 107 on the ground of the sports area)

According to some embodiments, data collected from sensors 100 can be communicated to a computing infrastructure 103. The computing infrastructure can include e.g. a local infrastructure and/or a cloud infrastructure as depicted in FIG. 1. In some embodiments, the computing infrastructure 103 can send commands to the sensors 100 (e.g. in order to make the sensors move, or to obtain specific data).

Communication between sensors 100 and the computing infrastructure 103 can be performed using known wireless and/or wire communication, such as radio communication, Bluetooth, Internet, etc. In some embodiments, the sensors 100 can communicate their data to a transceiver 102 which communicates data to another transceiver of the computing infrastructure 103.

According to some embodiments, additional data 115 can be collected from non-sensor sources and communicated to the computing infrastructure 103.

The additional data 115 can include (this list is not limitative);
data representative of the person (e.g., age, body dimensions, weight, statistics on historical activities/performance, relevant information collected from the media, etc.); and
data representative of the event (e.g., time, date, information on relevant subjects involved in the event, such as, for a sports event, team, coach, opponent, etc.).

According to some embodiments, computing infrastructure 103 can compute insights based on collected data (as explained hereinafter), and a corresponding output can be produced on an output device 104 (e.g. display) in communication (direct or indirect communication, such as through wire or wireless communication) with the computing infrastructure 103.

According to some embodiments, the computing infrastructure 103 determines a visual and/or audio signal to be produced based on the insights. For example, as explained hereinafter, the computing infrastructure 103 can superimpose on a video of the real scene of the event, the insights, or artifacts representative of these insights, or, in some embodiments, can compute a simulation representative of the real scene of the event in which artifacts representative of the insights have been inserted.

According to some embodiments, the collected data is processed in order to obtain insights indicative of a motion of one part of the person's body. For example, the insight can be indicative of an athlete's performance or of an athlete's punch. The results of the analytics can be displayed on the output device 104 (for example, in order to use them for creating on-screen overlays during the broadcasting of the fight, such as summary of the fight statistics, or artistic representation of insights discovered using the present invention) or passed to other external systems (other processing units, other virtual games or simulations, database, etc.).

Figure 1A:
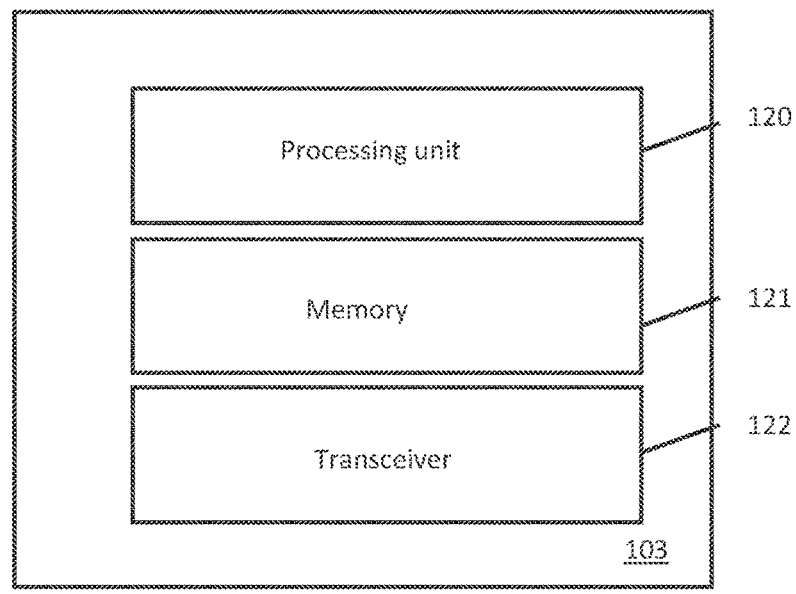
FIG. 1A depicts a possible embodiment of a computing infrastructure; which can be used to perform one or more methods in accordance with certain embodiments of the presently disclosed subject matter.

Attention is now drawn to FIG. 1A which depicts a possible embodiment of a computing infrastructure 103.

The computing infrastructure 103 can comprise a processing unit 120 and at least one memory 121. In some embodiments, the computing infrastructure 103 can comprise (or can be in communication with) a transceiver 122 (e.g. RF receiver, transceiver allowing Internet communication, etc.) for receiving data from the sensors. In some embodiments, the computing infrastructure 103 can send commands to the sensors, e.g. through transceiver 122.

Figure 1B:
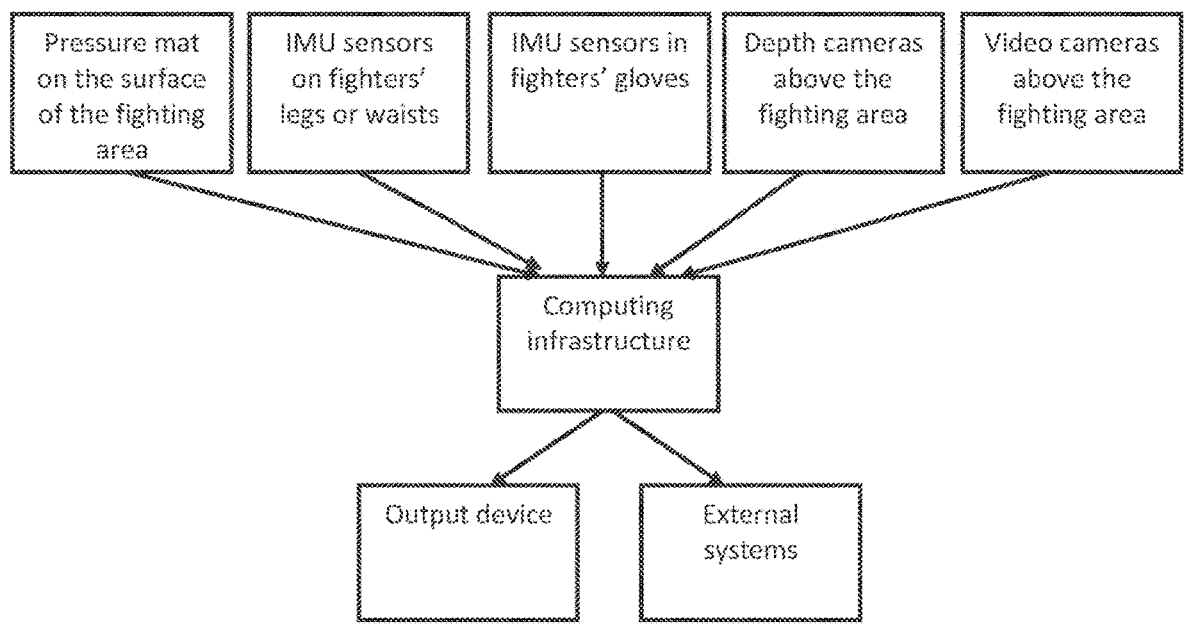
FIG. 1B depicts a use of the system of FIG. 1 in a specific application (martial event)

Attention is now drawn to FIG. 1B which depicts a use of the system of FIG. 1 in a specific application (martial arts event). This application is not limitative. In addition, the representation of FIG. 1B for this specific application (martial arts event) is not limitative.

As shown, various data collected from various sensors (e.g. pressure mat on the surface of the fighting area, IMU sensors on fighters' legs or waists, IMU sensors in fighters' gloves, depth cameras above the fighting area, video cameras above the fighting area) is transmitted to the computing infrastructure, which computes insights to be output on an output device or to be communicated to other external systems.

Figure 2:
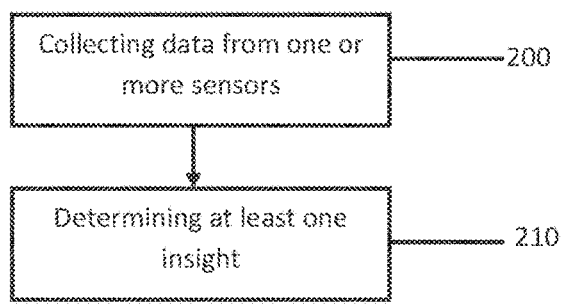
FIG. 2 depicts an embodiment of a method of computing insight(s)

Attention is now drawn to FIG. 2 which depicts a method of computing insights. This method can be performed e.g. by the computing infrastructure 103, and/or by another processing unit.

Data is collected from one or more sensors (operation 200), and in particular, from sensors which provide data indicative of the motion at least one part of the person's body. According to some embodiments, data is collected in real time, or quasi real time, during the event (e.g. sports event).

The measured data can be processed (operation 210) to determine at least one insight.

As explained in the various embodiments hereinafter, various different insights can be computed (see FIG. 3). According to sonic embodiments, these insights can be computed in real time or quasi real time, According to sonic embodiments, assume a given sport can be characterized as comprising a list of main different actions that each player can perform (these definitions can be provided e.g. by an operator), wherein each action can be defined by one or more parameters (defining e.g. intensity of the action, result of the action, such as failed or passed, spatial orientation, etc.).

For example, this list can include:
actions performed in martial arts can comprise performing an attack, such as a "punch" (parameters can comprise e.g. number of punches, speed of punches, strength of punches, location of impact of punches, punch types, hit, missed, or blocked punch, etc.), a "kick" (parameters can comprise e.g. number of kicks, speed of kicks, strength of kicks, location of impact of kicks, kick type, hit, missed, or blocked kick, etc.), a "takedown/throw" (parameters can include e.g. strength of the throw or takedown, etc.), etc.;
actions performed in basketball can comprise "dribbling" (parameters can comprise e.g. duration, length of the route, etc.) "running" (parameters can comprise e.g. speed, duration, length of the route, etc.), "jumping" (parameters can include height), special moves, throws, etc.; and
actions performed in soccer can comprise "dribbling" (parameters can comprise e.g. duration, length of the route, etc.), "shooting" (parameters can comprise e.g. strength), "tackling" (parameters can comprise e.g. intensity of the tackle), "running" (parameters can comprise e.g. speed, duration, length of the route, etc.).

In some embodiments, the actions of a given sport can be defined with more precise or different categories depending on the definitions provided by the operator.

According to sonic embodiments, determining at least one insight (operation 210) can comprise (see reference 300 in FIG. 3) determining one or more actions performed by the person in the sports event (and in some embodiments, with one or more parameters defining these actions, as explained above).

In some embodiments, this can be applied to other events (which are not necessarily sport events) which can be characterized by a list of different actions that a person can perform in the event.

According to some embodiments, assume that at least some situations occurring in a given event, such as a given sport, can be characterized by a list of main different situations (this list can be defined e.g. by an operator). For example, a sport can be defined as comprising a list of main different sport situations, as explained below.

According to some embodiments, each situation can be associated with parameters.

For example, this list can include:
  in martial arts, a list of fighting situations can include "distance fight" (parameter can include distance between the fighters), "clinch" (parameters can include e.g. type of clinching position, e.g. "Underhook"; "Overbook", "Bear Hug", "Collar tie" etc., clinch duration, punch intensity and frequency); "around fighting" (parameters can include e.g. type of ground fight, e.g. punching, locks, chokehold etc., duration, punch intensity and frequency, fighter's relative position, etc.), "interruption of the fight", (parameters can include duration), etc.;
  in basketball, this list of situations can include "attack/defense phase of team A", "attack/defense phase of team B", "time-out"/"ball holding phase", etc.; and
  in soccer, this list of situations can include "attack/defense phase of team A", "attack/defense phase of team B", "time-out"/"ball holding phase", etc.

Therefore, according to some embodiments, determining at least one insight (operation 210) can comprise (see reference 310 in FIG. 3) determining one or more situations occurring in the event (and in some embodiments, with one or more parameters defining these situations, as explained above). This can be applied to a sports event but also to other events that can be characterized by different main situations that may occur in this event.

Figure 3:
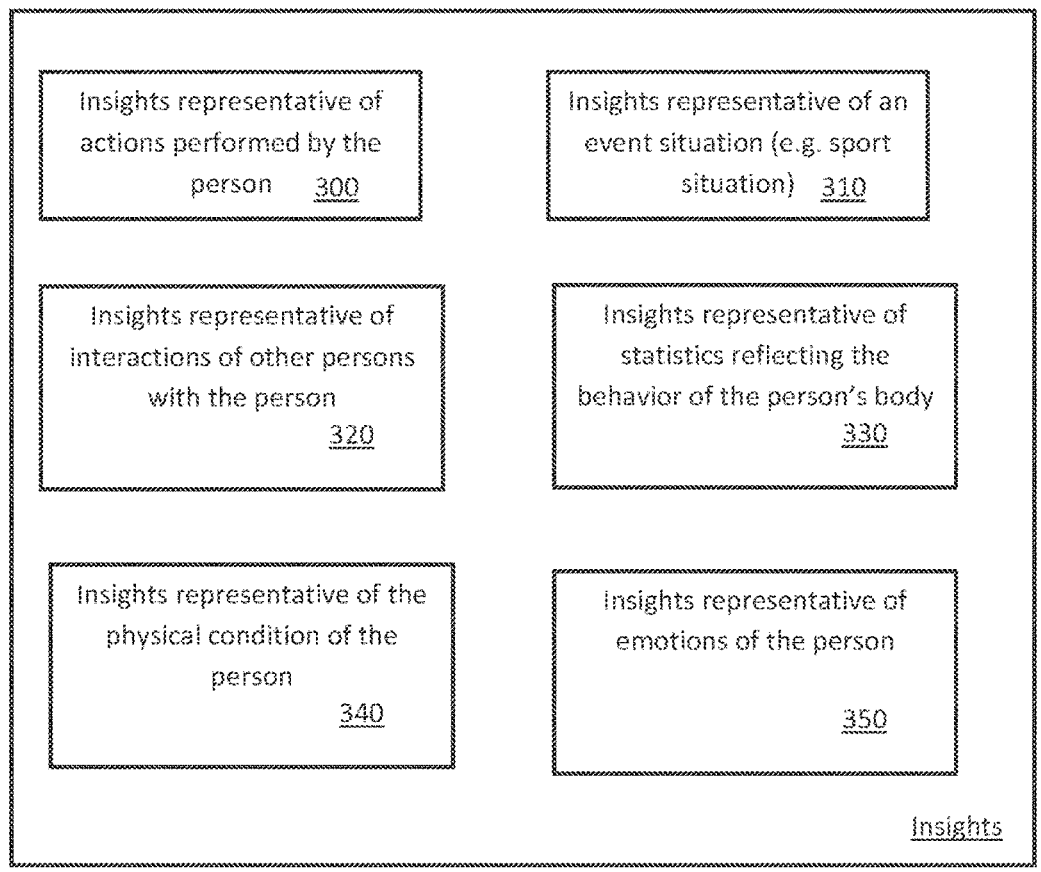
FIG. 3 depicts an embodiment of insights that can be determined.

According to some embodiments, the insight can be representative of interactions (direct/indirect interactions) of one more other persons with the person in the area (see reference 320 in FIG. 3).

This can include at least the following insights (this list is not limitative):
  the insight can be representative of the behavior of one or more other persons in the area who have physical contact with the person's body (various examples will be provided hereinafter, such as, for example, impact of a punch produced by another person and received by the person carrying the sensor, etc.); and
  the insight can be representative of behavior of one or more other persons in the area who do not necessarily have physical contact with the person's body, but whose behavior can influence the behavior of the person's body (for example, in a sports event, instructions from coach, reaction of the public, etc.).

According to some embodiments, the insight can comprise statistical data representative of the behavior of the person's body over time (see reference 330 in FIG. 3).

For example:
  in martial arts, this can include resilience (which characterizes to what extent the fighter resists attack of the other fighter), endurance, average punch strength, fight style, energy spent during the fight, offensiveness/defensiveness, etc.;
  in basketball, this can include shooting style, average speed, etc.; and
  in soccer, this can include shooting style, average speed, etc.

According to some embodiments, the insight is indicative (see reference 340 in FIG. 3) of at least one physical condition of the person (e.g. energy level, tiredness, etc.).

According to some embodiments, the insight is indicative of emotions (see reference 350 in FIG. 3) of the person (e.g. level of stress, etc.).

According to some embodiments, other insights can be determined.

Figure 4:
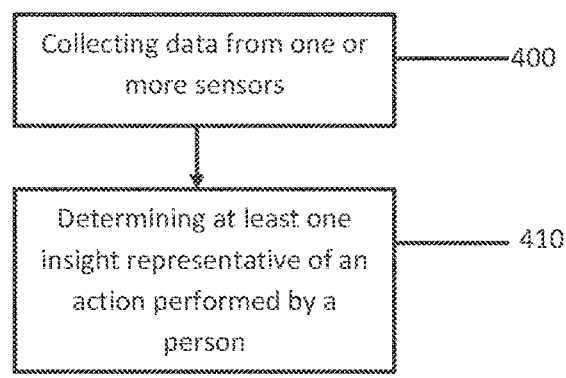
FIG. 4 depicts a method of determining an insight representative of one or more actions performed by a person.

Attention is now drawn to FIG. 4, which depicts a method of determining an insight representative of one or more actions performed by a person (see reference 300 in FIG. 3). This method can be performed e.g. at least by the computing infrastructure 103.

The method can comprise collecting (operation 400) data from one or more sensors (in particular sensors 110 described above, which are associated with the person and/or external sensors such as video cameras), and determining (operation 410) at least one insight representative of an action performed by a person.

Detecting an action performed by a person can comprise collecting data of at least one sensor which can provide data representative of a part of the body which is relevant for performing this action, and determining if this action has been performed based on this data.

According to some embodiments, this determination can comprise comparing the collected data with one or more thresholds (which are representative of the fact that this action has been performed), and/or feeding the data to a trained classification algorithm (which was trained using past data—e.g., using supervised learning involving an operator). Examples of supervised classification algorithms include machine learning algorithm. In particular, it can include Random Forest, Gradient Busting Trees, Support Vector Machines, Neural Network based classifiers (non-limitative examples include Deep Learning algorithms, Recurrent and Convolutional Neural Network), mixed Neural Network, etc.

Figure 4A:
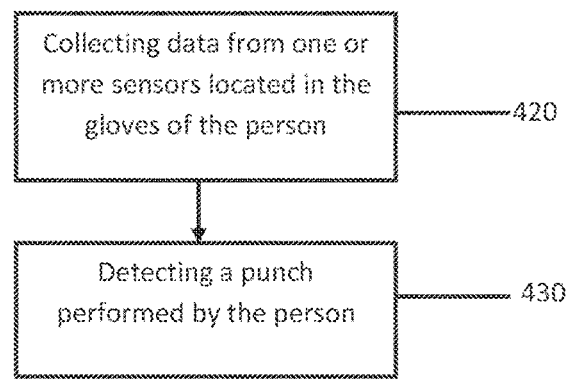
FIG. 4A depicts a method of determining an insight representative of a punch performed by a fighter.

In order to illustrate the determination of such an insight, assume, as a non-limitative example, that the event corresponds to a martial arts event, and that it is attempted to detect an action which corresponds to an attack performed by a fighter this example a "punch"). This example is illustrated in FIG. 4A.

Various methods can be used for detection of this action.
According to some embodiments, any sequence of collected data (in this example, this data generally comprises data collected from sensors located on the gloves or on the hands of the fighter, see operation 420) for which one or more thresholds has been exceeded, can indicate that a punch has been performed (operation 430).

In particular, it can be determined whether:
  magnitude of acceleration exceeds a threshold;
  magnitude of gravity free acceleration (norm of 3 axis) exceeds a threshold; and
  projection of the acceleration on the axis parallel to the lower arm of the fighter pointing in the direction of the fist, exceeds a threshold, etc.

According to some embodiments, the thresholds can be set by an operator.

According to some embodiments, the threshold(s) can be set using statistical methods, e.g. by comparing statistical values (e.g. mean values) for data representative of a punch, and data which is not representative of a punch. In some examples, the threshold can be set e.g. in the middle of those values, but this is not limitative.

According to other embodiments, and as mentioned above, a punch can be detected using a supervised classification algorithm (see above various examples of such algorithms). For example, an operator indicates (based e.g. on a training set comprising a plurality of past fight videos) a time interval in which a punch is present, thereby indicating which data (collected from IMU sensors located on the gloves or on the hands of the person) reflects a punch. This data is fed to the supervised classification algorithm which learns and updates its prediction model accordingly. A training method such as backpropagation for neural network based models can be used in the training phase. This is however not limitative.

According to some embodiments, the training phase comprises cutting windows of fixed size from the input time series data (e.g. data collected from the IMU sensors in the gloves) around the "time of impact" of the punch. The time stamps for approximate start and stop of the punch can be provided by a human operator.

The "time of impact" (which corresponds to the punch) can be defined as the time at which the deviation of the acceleration magnitude is furthest away from the mean of acceleration magnitude within the window defined by the human operator. Alternative heuristics can be used, such as looking for a local minima for the acceleration along an axis co-directional with the lower arm and directed towards the hand, within the window defined by the human operator, According to some embodiments, the model can be trained not necessarily based on the raw data (data collected from the sensors), but on features extracted for each window of data.

For example, assume acceleration and angular velocity data is collected over time from the sensors.

According to some embodiments, aggregative statistics (which constitute features for the model) per sensor axis can be extracted (e.g. min, max, median, mean, quintiles, etc.) from the window of raw data, as well as more advanced features like zero crossing rate, features based on the data after Fourier transform etc.

These features can then be used to train the machine learning model instead of a window of raw data. Supervised training can be performed similarly to what was described above, in which an operator indicates when an action was performed over time.

If the model was trained based on such features, when it is attempted to determine insights (e.g. detection of an action) based on live data streamed during the event, this live data has to preprocessed before it is supplied to the model for prediction, in order to extract the same features that were used during the training of the model.

During the detection on streaming data, window (set of data collected from the sensors and cut on a specific time interval) of the same size as during training can be cut out for each new sample (respective sample being the end of the window) and passed on to the classifying algorithm.

For each such window, the classifying algorithm produces class probabilities the example mentioned above, classes can include "punch" and "no punch").

Punch can be detected e.g. for local maxima in the time series for which probabilities for the "punch" class exceed the probability of the "no punch" class.

According to some embodiments, a separate model can be trained for each fight situation.

According to some embodiments, the fight situation can be a feature of the model (in this case an operator indicates when a punch is detected and also the fight situation for training the model).

According to some embodiments, for some classifying algorithms, due to the fact that the windows used for training were cut around the point of impact of the punch (i.e. this point is always in a fixed position within the window) the class probability of the "punch" class should be the highest for the windows of the streaming data for which the point of impact is located on the same position. This property can be used in the post-processing of the results.

In some embodiments, an algorithm which detects motion of the body of the person based on a video (e.g. "Open-Pose"—this is not limitative) can also be used to detect attacks such as strikes (e.g. punches, etc.). Data provided by the motion detection algorithm can also be fed to the machine learning algorithm for its training.

According to some embodiments, the area of impact of the punch is detected. In some embodiments, a machine learning model is trained based on the data from the IMU sensor in the glove to determine this area of impact. This can be combined with pose data extracted from the cameras (motion of the body extracted from video cameras) as features for the model and/or by defining heuristics.

Similar methods can be used for detecting other actions in a martial arts event, such as other strikes (in this case data collected from sensors located on the relevant limb is extracted). A "strike" is used as a general expression including e.g. a punch, a kick, knee strikes, elbow strikes, etc.

For example, detection of data which exceeds a threshold, and/or use of a supervised classification algorithm trained based on past historical data can be used. Therefore, the method is not described again for detecting other actions (one should refer to the example provided above).

More generally, similar methods can be used in other sports events to detect an action.

Jumping can be detected e.g. by using at least data collected from a height sensor located on the player (and possibly from data collected from video cameras). This data can be processed e.g. using the embodiments described above for punch detection (threshold detection, supervised classifying algorithm, etc.)

Running can be detected based on data provided by a speed sensor located on the player and/or by video sensors. This data can be processed using the embodiments described above for punch detection (threshold detection, supervised training of a classifying algorithm using training data—e.g. historical data—and detection based on the trained algorithm, etc.).

Dribbling can be detected based on data provided by a IMU sensor located on the player and/or by video sensors and/or by IMU sensors present in the ball. This data can be processed using the embodiments described above for punch detection supervised training of a classifying algorithm using training data—e.g. historical data—and detection based on the trained algorithm, etc.). In some embodiments, an algorithm which detects motion of the body of the person based on a video can also be used (e.g. "OpenPose")—in particular data output by the algorithm can be fed to the classifying algorithm for its training.

Shooting (e.g. in soccer or basket-ball) can be detected based on data provided by a IMU sensor located on the player and/or by video sensors and/or by IMU sensors present in the ball. This data can be processed using the embodiments described above for punch detection (supervised training of a classifying algorithm using training data—e.g. historical data—and detection based on the trained algorithm, etc.). In some embodiments, an algorithm which detects motion of the body of the person based on a video can be used (e.g. "OpenPose")—in particular data output by the algorithm can be fed to the classifying algorithm for its training.

Tackling can be detected based on data provided by an IMU sensor located on the player and/or by video sensors and/or by IMU sensors present in the ball. This data can be processed using the embodiments described above for punch detection (supervised training of a classifying algorithm using training data—e.g. historical data—and detection based on the trained algorithm, etc.). In some embodiments, an algorithm which detects motion of the body of the person based on a video can be used (e.g. "OpenPose")—in particular data output by the algorithm can be fed to the classifying algorithm for its training.

These examples are not limitative, and for each action, relevant sensor data can be collected and analyzed accordingly. This can be applied similarly to other events which are not sports events.

Figure 5:
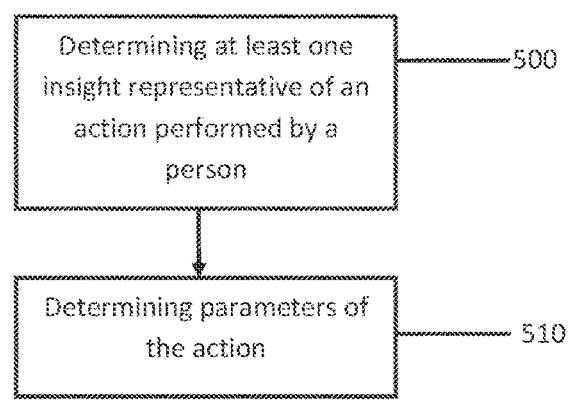
FIG. 5 depicts a method of determining parameters of an action which was identified using e.g. the method of FIG. 4.

Attention is now drawn to FIG. 5, which depicts a method of determining parameters of an action which was identified using e.g. the method of FIG. 4. This method can be performed e.g. by the computing infrastructure 103.

The method can comprise determining at least one insight representative of an action performed by a person (see operation 500, which is similar to operation 410), and determining parameters of the action (see operation 510).

Figure 5A:
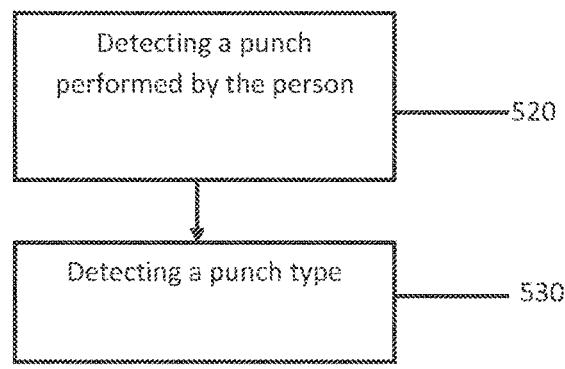
FIG. 5A is an example of the method of FIG. 5 for a punch.

A non-limitative example is provided in FIG. 5A, in which a punch was detected (see reference 520) and it is attempted to determine a punch type (which is a possible example of a parameter of a punch, see reference 530).

Punch type can comprise various categories which can be e.g. defined by an operator, such as jab, hook, uppercut, etc.

According to some embodiments, a classification algorithm (examples of classification algorithm were provided with reference to FIG. 4) can be used which has been trained based on historical data.

In the case of a punch, the data can comprise e.g. data collected from IMU sensors located on the gloves or hands of the fighter. In addition, the data can comprise data collected from video cameras.

The training can be performed similarly to what was described for punch detection.

In particular, an operator can provide labels to identify the punch type in various historical data that was collected. A corresponding training set is built and fed e.g. to the classification algorithm (e.g. machine learning algorithm) for its training. The trained model can be used to identify a punch type based on the collected data. In addition, algorithms (such as OpenPose—this is not limitative) can be used to track the skeleton/body of the fighter in the video. The data output by the tracking algorithm can be used as features for training the machine learning algorithm during its training phase (and therefore, these features can also be used in the punch type detection phase).

According to some embodiments, a plurality of classification algorithms can be used. In particular, according to sonic embodiments, a fighting situation can be determined, and, therefore, a classification algorithm can be trained for each fighting situation separately (data extracted for each fighting situation is used to train the classification algorithm). As a consequence, when a punch is detected, and a given fighting situation is detected, the collected data is fed to the classification algorithm that was specifically trained for this fighting situation.

According to some embodiments, the fighting situation can be used as a categorical feature for the model (in this case, the operator indicates during the training, the punch type and the fighting situation).

The method described for punch type determination can be used for other attacks. For example, this can include strikes such as kick, elbow/knee strike, etc. Indeed, during a fight, a fighter makes a move, by using parts of his body, to physically challenge (by means of blows/strikes/punches, etc.) his opponent, and therefore insights representative of this move can be computed.

In this case, the data correspond to data collected from a sensor located on a relevant limb of the fighter (for example, for a kick, the sensor is located on the legs). Kick type can include e.g. front kick, back kick, side kick, etc.

In martial arts, a type of attack can be detected. This can be applied similarly to other sports.

For example, in soccer, a type of shooting can be determined (e.g. Push Kick, Instep Kick, Outside Kick etc.).

In basketball, the action to detect can be a jump, and action type can be a throw or a dunk, for example.

Similar techniques as described for punch type detection can be used.

The types of respective actions can be annotated by a human and the data from sensors (wearable IMU/video cameras) around the annotated actions will be supplied to the supervised machine learning algorithm (see examples above) along with the labels for its training. The trained model can be used to predict the action types for each data window around an action which was detected as explained above.

According to some embodiments, a parameter of the action "punch" (and more generally of a strike/attack in a fight) which was detected, can be "hit", "block" or "miss". The category "hit" corresponds to the fact that the punch hit the other fighter on his body. The category "block" corresponds to the fact that the punch was blocked by the other fighter (e.g. using his gloves or hands). The category "miss" corresponds to the fact that the punch did not impact the other fighter.

A method of classifying the punch into "hit", "block" or "miss" is described below with reference to FIG. 6.

Once a punch has been detected (reference 600, using e.g. the method of FIG. 5A), the windows in which the punch was detected can be further processed to classify the punch into "hit", "block" or "miss".

Figure 6:
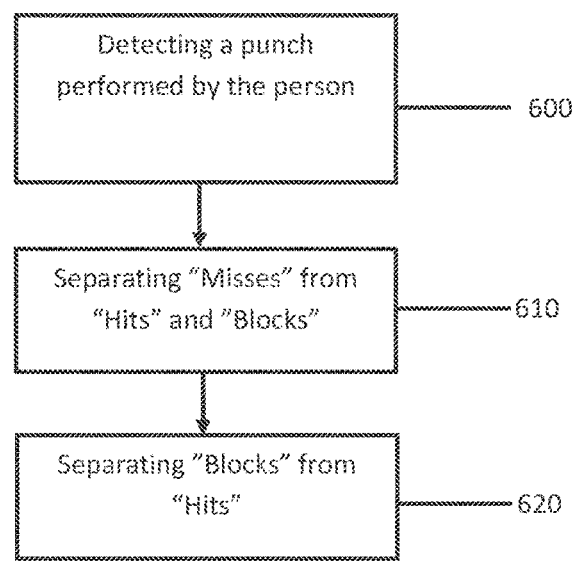
FIG. 6 describes a method of classifying a punch into "hit", "block" or "miss"

"Misses" can be separated from the "Blocks" and "Hits" (reference 610 in FIG. 6). This can be performed e.g. using the same approach as for punch type classification (use of a supervised learning algorithm based on data collected from IMU sensors located on the hands or gloves of the fighter/data collected from video cameras). In other embodiments, analysis of the acceleration/velocity using e.g. statistical models can be performed to distinguish between misses and blocks and hits.

Then "Blocks" can be distinguished from (reference 620 in FIG. 6).

According to some embodiments, a classification algorithm, which has been trained using past historical data and annotation of an operator (indicating when a block or a hit is present), can be used to detect if the punch is a block or a hit. Examples of such an approach have been provided above.

According to some embodiments, a heuristic-based approach is used. One possible heuristic-based approach is based on the presence or the absence of an impact wave in the acceleration data from the glove sensors of the fighter being punched. If there is an impact wave during the punch, then this punch is classified as "Block", otherwise it is classified as "Hit".

Although an example of a punch has been provided, the method can be applied to various other actions and associated parameters. For example the method can be applied similarly to other attacks. For example, this can be applied to strikes such as kicks, knee strikes, elbow strikes, etc. In this case, data is collected from sensors located on the relevant limb of the fighter (together, if necessary, with data from video sensors). Therefore, it is possible to classify similarly if the strike was a "hit", "miss" or "block" strike.

Below are provided other non-limitative examples.

If the detected action is a strike, the number of strikes can be determined. A counter can be stored in a memory for each person involved in the fight, and incremented each time a strike is detected.

If the detected action is a strike, a speed of the strike can be determined.

A non-limitative example of a method of determining speed of a strike is provided below for a punch, but this method applies to other strikes. The windows labeled as "punch" by a classification model (punch detection model) are processed for punch speed estimation.

According to some embodiments, the speed for each point in time during the punch can be obtained by integration of the gravity free acceleration converted to a fixed coordinate system using data from gyroscopes and magnetometers. The starting point for integration can be selected using a heuristic-based approach. One possible heuristic is setting a time offset that should be subtracted from the "time of impact" and using the resulting time as the start for the integration. The offset can be defined approximately based on annotated starting and impact times of the punch. This offset can be set separately for each punch type. Maximum speed in the punch time window can be reported.

According to some embodiments, a regression model trained on historical data (recorded e.g. in a laboratory) can be used. Similar features as for punch type classification can be used in the model (see above). Ground truth for the speed model can be obtained based on the annotation of the video of the punch with high frame rate, or using a radar based system, or using marker-based or marker-less video motion tracking systems.

According to some embodiments, a plurality of different models can be used. For example, a separate model can be can be trained for each fight situation, for "hits", "blocks" and "misses" (see above determination of hits, blocks and misses) or for each "strike type".

If the detected action is a strike, a strength of the strike can be determined.

A non-limitative example of a method of determining strength/force of a strike is provided below for a punch, but this method applies to other strikes.

The windows labeled as "punch" by a classification model (punch detection model), and which are not determined as corresponding to a "miss" (see below) are processed for punch force estimation.

If a load sensor is not present in gloves, then it is necessary to convert data received from e.g. IMU sensor present in gloves into a force.

The punch force can be defined e.g. as the maximum force applied to the object being punched during the time of contact. This force can be estimated based on a regression model (e.g. machine learning model) trained on historical data (IMU data) recorded in a laboratory. This data can be recorded using a load sensor in order to obtain the ground truth. Similar features as for punch type classification can be used in the model (see above).

According to some embodiments, a separate model can be trained for each fight situation, for hits and blocks, or for each punch type.

According to some embodiments, a plurality of different models can be used. For example, a separate model can be trained for each fight situation, for "hits", "blocks" and "misses" (see above determination of hits, blocks and misses) or for each "strike type".

Similar methods can be used to detect throws and takedowns. In particular, data collected from IMU sensors on gloves, and/or data collected from video sensors can be used to train a classifier using a supervised method involving an operator, as described above. In some embodiments, a separate model can be trained for each fight situation.

According to some embodiments, pressure measured on the ground of the sports area can be used in addition, or, solely, to detect throws and takedowns.

As already mentioned above, various other actions performed by a person in various sports or events can be determined. Associated parameters can be determined as explained below.

In basketball, the action "dribbling" can be determined. The windows in which the dribbling was identified can be processed to determine parameters such as duration of dribbling, length of the route using (e.g. a position sensor, etc.). Classification algorithms which were trained using historical data and annotation of an operator for labelling the training set can be used, and once a model has been obtained, can be used for determining parameters of e.g. dribbling.

In basketball, the action "jumping" can be determined. A position sensor located on the person's body can be used to detect the height of the jump.

In basketball, the action "blocking" can be determined by detecting e.g. a jump of the player and then analyzing motion of the ball with a position sensor located in the ball.

In soccer, the action "shooting" can be determined. Strength of the shoot can be determined similarly to what was described for detecting strength of a punch (data from sensors located on the body of the player can be used—in addition, data from EMU sensors located in the ball can be used for training a model and detecting this strength). The action "shooting" or "throwing" can be also detected in basketball using e.g. sensors in the ball, and/or video sensors (which allow detecting motion of the ball towards the basket) and/or using data from sensors located on the body of the player (machine learning model can be trained based on historical data as already explained for other insights).

In soccer, the action "tackling" can be determined. Strength of the tackle can be determined similarly to what was described for detecting strength of a punch (data from sensors located on the body of the player can be used, in order to derive e.g. strength from an acceleration of the player during the tackle—in addition, data from IMU sensors located in the ball can be used for training a model and detecting this strength).

In a sport involving "running", the action "running" can be determined, e.g. by an IMU sensor located on the body of the player. The speed of the player can be detected using the IMU sensor. When this speed is above a predefined threshold (which can be defined for each sport and for each player), this can indicate that the player is running The length of the route can be determined using e.g. a position sensor (e.g. GPS sensor)

Figure 7:
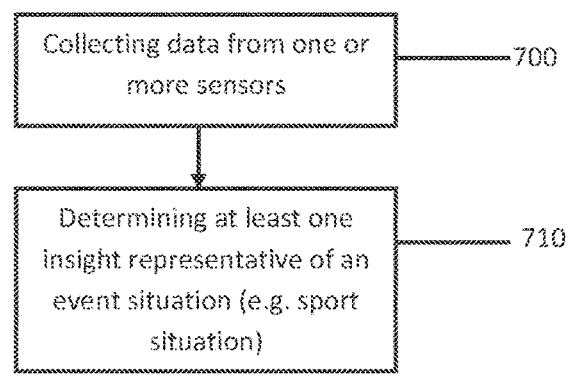
FIG. 7 describes a method of determining at least one insight representative of an event situation (e.g. sports situation), based on collected data.

Attention is now drawn to FIG. 7.

As mentioned above, according to some embodiments, a method can comprise determining (see reference 710) at least one insight representative of an event situation (e.g. sports situation), based on collected data reference 700).

A non-limitative example will be provided with reference to martial arts, but this can apply to other sports or events.

In order to classify the event situation, or by an example fight situation (examples of relevant fight situations classifications can include "distance fight", "clinch" or "ground fight"), a classification algorithm (see above various examples of classifiers) can be trained.

According to sonic embodiments, the input data can be obtained from one or more sensors associated with at least one part of a person's body (see FIG. 1). In the example of a fight, the sensors may be attached to a limb of the fighter.

According to some embodiments, the input data can be obtained from sensors spread in the area of the event. This can include for example, video cameras in the fighting area.

The model of the classification algorithm can be trained using historic data labeled by a human operator. The operator can indicate for different sequences ("windows") of collected data a label indicative of the fight situation. Windows of fixed size time can be used. According to some embodiments, a set of features can be extracted from this data and used to train the model (instead of raw data, as already explained in the embodiments above). Training of the model has already been described for punch detection, and punch type detection, and similar methods can be used and are not described again.

According to some embodiments, if a window contains annotations from different classes, this window is not used for training. For example, in martial arts events, a given punch can be seen as jab or cross by different experts, if the stance is not clear during the punch. In that case, the human annotator can be instructed to provide both labels as an annotation.

During prediction phase, for example when the model is applied on the streaming data from a live fight, according to some embodiments stepping window approach can be used (with step equal to the window size).

Stepping window (also referred to as a sliding or rolling window) implies that live stream of data is chunked to fix-sized windows and then these windows are supplied as an input to the predictive model. The step size determines the time between the starts of two consecutive windows. If the step is equal to the window size, then the next window starts right after the previous window ends.

The data is buffered until full window is received and then this window is passed on to the classifier while the next window is starting to be buffered. The model output can comprise the label (predicted fight situation) for each window. According to some embodiments, temporal smoothing can be applied as a post-processing step.

Temporal smoothing allows to correct short false detections for one detected situation in the middle of another (for example if the model detects a second of a "distance fight" in the middle of a minute of a "ground fight"). This can involve modifying the label to the most common in the neighborhood, or using Markov-based approaches.

According to some embodiments, the fight situation can be determined using pressure sensors measuring pressure on the ground of the sports area. For example:

distance fight is reported when there are three distinct high-pressure zones on the mat;
clinch is reported when there are only two such zones; and
ground fight is reported when there is a pressure zone on an area which exceeds a threshold.

According to some embodiments, data collected from video cameras can be used (in addition to data collected from other sensors, or instead of data collected from other sensors) to detect the fight situation. For example:

distance tight can be determined when there are three distinct objects above a curtain height above the fighting area surface;
clinch fight can be determined when there are such objects; and
ground fight can be determined when there is only one such object, specifically a referee.

This can be applied to other sports, wherein the rules used for determining the fight situation are specific for each sport.

For soccer and basketball, this can include distinguishing between attack, ball holding, and free/penalty shots.

The classification can be done using heuristics on top of the detected passes, shots and players' positions. Passes/shots can be detected as explained above for detecting shooting (passes can be distinguished from shoots e.g. based on position/IMU sensors in the ball).

For example, frequent passes in the center of field in soccer would be an indication of a ball holding situation, whereas several players of the both teams moving fast towards one of the goals would be indicative of an attacking situation. These can also be classified using machine learning models trained on historical data for these features (i.e. passes, shots and players' positions).

Examples of training have already been provided above and can be used similarly.

According to some embodiments, the situation can be determined based on data received from position sensors located on the players. For example, in basketball, in which team A and team B are competing, it can be detected that team A is in an attack phase because the majority or all of its players is located in a given zone of the sports area, and that team B is in an attack phase because the majority or all of its players is located in another given zone of the sports area.

According to some embodiments, a time-out can be detected when the speed of the majority, or all of the players, is below a predefined threshold.

This can be applied similarly to soccer.

According to some embodiments, data collected from video cameras can be used to detect whether a team is currently in an attack phase or defense phase (image recognition algorithms of the players, based e.g. on the color of their clothes, can be used). hi particular, data collected from depth cameras installed above the area can be used as additional input of the classification algorithm (both for training and prediction phases).

Figure 8:
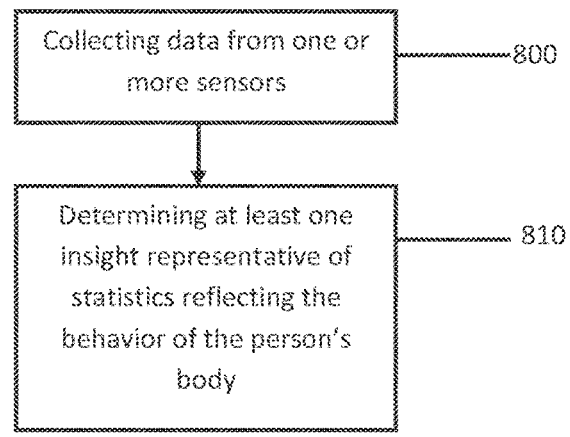
FIG. 8 describes a method of determining at least one insight representative of statistics reflecting the behavior of the person's body, based on collected data.

According to some embodiments, the insight can comprise (see FIG. 8, operations 800/810) statistical data representative of the behavior of the person's body over time (see reference 330 in FIG. 3). Several processing of the insights can be performed in order to obtain statistical data representative of the behavior of the person's body over time.

An example of analytics that can be produced is provided in the field of martial arts, but similar analytics can be produced in other sports or events.

Figure 9:
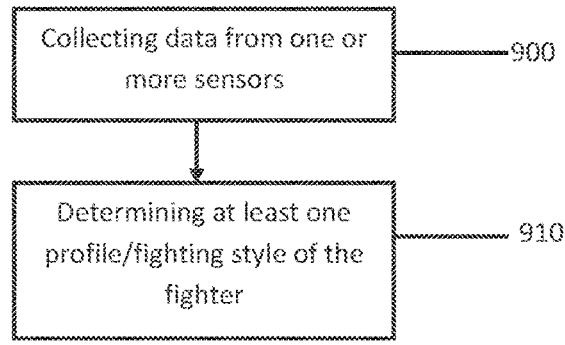
FIG. 9 describes a method of determining at least one profile/fighting style of a fighter, based on collected data.

According to some embodiments, a fighting style of the fighter is determined (see FIG. 9, operations 900/910). This can comprise comparing relative frequency of the fighting techniques used (e.g. punches, kicks, throws etc.) with a reference/characteristic profile for each fighting style (containing relative frequencies of various strikes used in this fighting style) prepared by an expert, and/or computed from other fighters.

For example, the comparison can be performed by computing Euclidian distance between the profiles and the relative frequency of the fighting techniques used by a specific fighter.

This can be performed mutadis mutandis for other sports. For example, a playing style of a basketball player can be established by comparing relative frequency of the playing techniques used (e.g. number of shoots, etc.) with a reference/characteristic profile for each playing style (containing relative frequencies of various playing techniques used in this playing style) prepared by an expert, and/or computed from other players.

According to some embodiments, energy spent during the fight is estimated by estimating the amount of motion performed during the fight. This can comprise e.g. integrating acceleration data and comparing this data to a precomputed reference table. The reference table identifies the correspondence between the metric of amount of performed motion and amount of energy spent, thereby providing the energy spent during the fight.

According to some embodiments, offensiveness/defensiveness of a fighter can be assessed by comparing the number of offensive actions (e.g. throws, punches, takedown) with respect to defensive actions (e.g. blocks, etc.). A fighter with a higher number of punches, takedowns and less blocks, can be considered as more offensive.

This can be applied to other sports. For example, a soccer player with a higher number of tackles than other players can be considered as more defensive. In basketball amount of blocks and/or throws can be used in a similar way to characterize offensiveness.

Figure 9A:
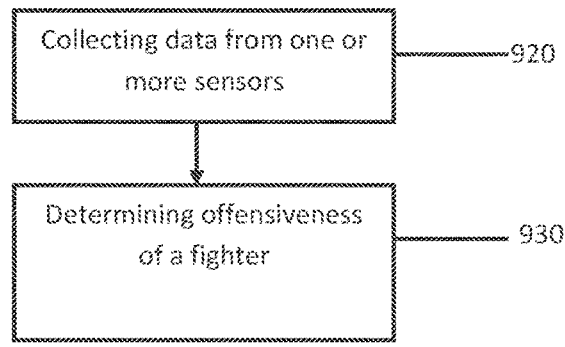
FIG. 9A describes a method of determining offensiveness of a fighter, based on collected data.

According to some embodiments, offensiveness or defensiveness can be detected as follows (see FIG. 9A, operations 920/930).

Video cameras provide data required to track the position of the fighters and referee within the fighting area. Fighters can be recognized using an image recognition algorithm (including face recognition algorithm, or based on recognition of clothes which are of different color between the fighters, or using pose/skeleton data obtained e.g. using OpenPose algorithm). This data can be used to control the fighting area space. According to some embodiments, for every position of the two fighters, one can draw a line segment connecting their positions, and then draw another line perpendicular to this segment through its middle. The resulting split of the fighting area can be used as a measure of space control of each fighter. Space control is one of the factors defining the dominance in the fight. In some embodiments, offensiveness of the fighter can be defined e.g. as a percentage of time the fighter moves towards his opponent.

According to some embodiments, endurance or resilience can be determined as follows.

Resilience can be determined by comparing the energy level/tiredness of the fighter with respect to the number of attacks that the fighter has to undergo.

Endurance can be determined by comparing the energy level/tiredness of the fighter with respect to the number of attacks that the fighter performs over time (or with his level of offensiveness).

According to some embodiments, energy level and/or tiredness can be detected as follows.

The energy/tiredness level can be determined using heuristics based on reasonable assumptions about human physiology. For example, it can be inferred by assuming a certain amount of energy spent for each detected punch (taking into account type, speed and force of the punch). Energy recovery can be also modeled as a function of time and punches already performed. The specific parameters of these heuristics (amount of energy spent per punch and coefficients in the energy recovery function) can be tuned during experiments when the tiredness is inferred for physiological data recorded as part of the experiment and/or based on expert opinion.

According to some embodiments, emotions (e.g. level of stress) can be detected similarly.

Heuristics here are based on the assumption that some contexts are more stressful for an athlete than others. For martial arts, stress level can be assumed to be inversely proportional to the dominance of the fighter in the fight (this is only an example). The latter can be inferred from punches received and accumulated damage, space control, position control (e.g. being on top during a ground fight). The parameters for these heuristics can be fine-tuned during controlled experiments, where physiological data is also measured, or through expert opinion.

Alternatively, relative decrease in energy can be inferred from change in an athlete's behavior. For martial arts, decrease in energy level can be inferred from decrease in frequency, speed and strength of the punches.

The same method can be applied to determine stress level. If, for example, the fighter punch accuracy is dropping, this can be used as an indirect measure of stress level.

Figure 10:
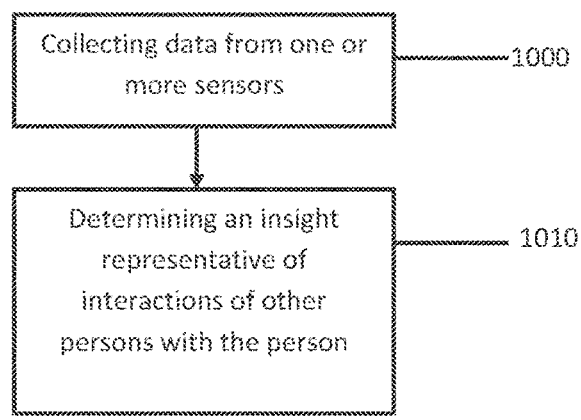
FIG. 10 describes a method of determining an insight representative of interactions of other persons with the monitored person.

As mentioned above, according to some embodiments, the insight can be representative of interactions (direct/indirect interactions) of one or more other persons with the person in the area FIG. 10, operations 1000/1010).

Indirect interaction can include e.g., instructions from a coach (which can be detected e.g. by an audio sensor carried by the coach), instructions from the referee (which can be detected e.g. by an audio sensor carried by the referee), reaction of the public located at the sport's area (which can be detected by the level of sound produced by the public), etc. Other indirect interactions can be detected and this is not limitative Direction interaction can include e.g. in martial arts, detecting a punch received by a fighter from another fighter. Detection of this punch can be performed as explained in the embodiments above.

Figure 11:
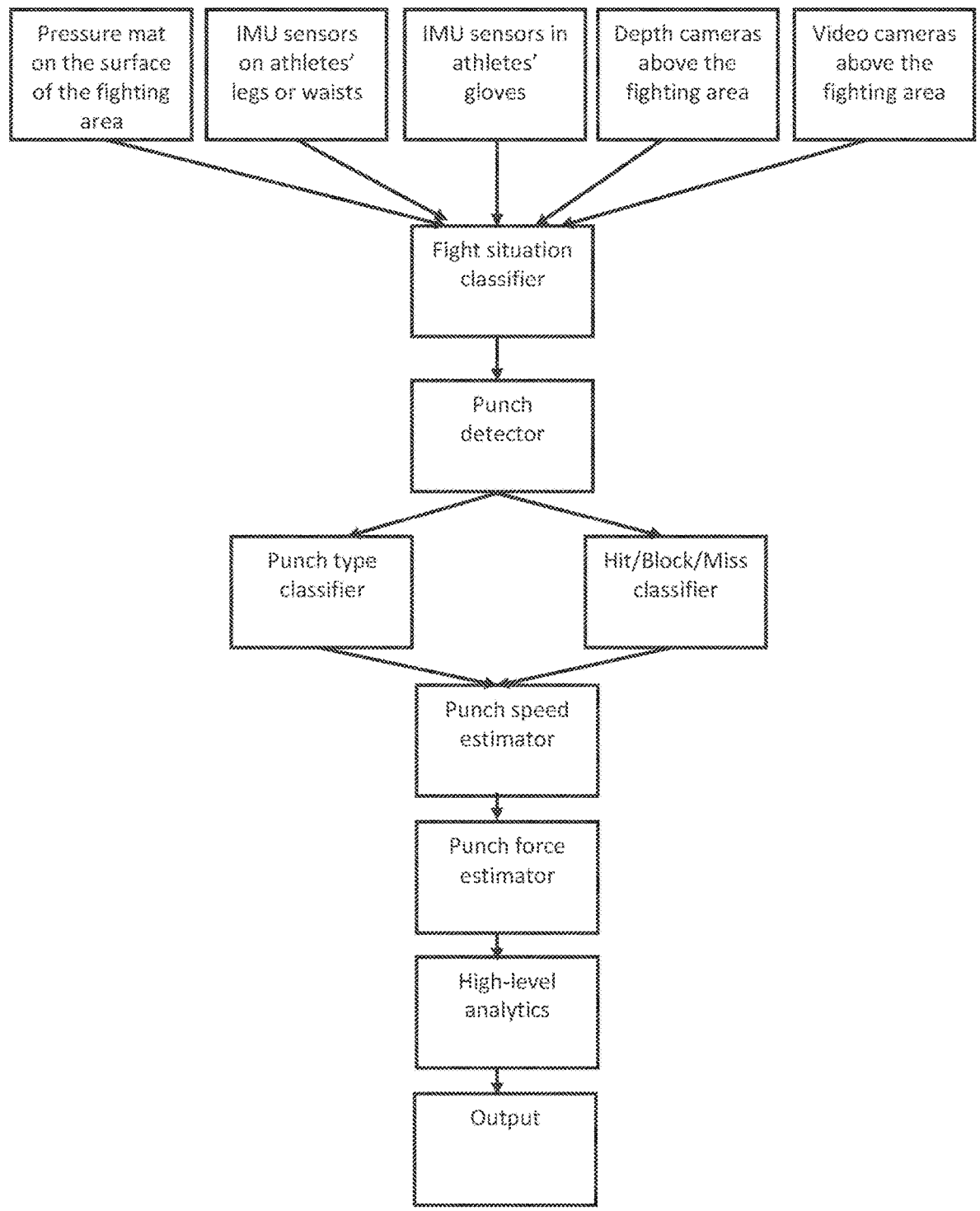
FIG. 11 depicts logical data processing steps which can be used in order to obtain insights on fighters' performance and fight situations related to the example of punch analytics.

Attention is now drawn to FIG. 11, which depicts logical data processing steps which can be used in order to obtain insights on fighters' performance and fight situations related to the example of punch analytics. Although this example is related to martial arts, similar logical data processing steps can be built for other sports or events.

Data collected from sensors located e.g. on each fighter's gloves (optionally along with data from additional sensors described above) can be first used to determine the fight situation (e.g. whether it is a clinch, distance or ground fight). Insights representative of the fight situation can be used on their own, or as an additional input for further analytics.

Then, punches can be detected (as explained e.g. in FIG. 5A) and data representative of the detected punches is passed on further to the Punch Type Classifier (see FIG. 5A) and Hit/Block/Miss Classifier (see FIG. 6).

According to some embodiments, results of these analytics can be used as an input for Punch Speed Estimator along with the raw sensor data or features extracted from an IMU sensor located in the gloves. In a similar fashion, results of the previous analytics can be used as an input for the Punch Force Estimator. Alternatively, output from Punch Detector may be transmitted directly to Punch Speed Estimator and/or Punch Force Estimator.

High-level analytics can be computed based on the results of the previous modules in order to produce more semantically rich insights as described earlier. Insights produced by all the modules can be then displayed on the output device as explained hereinafter.

Figure 12:
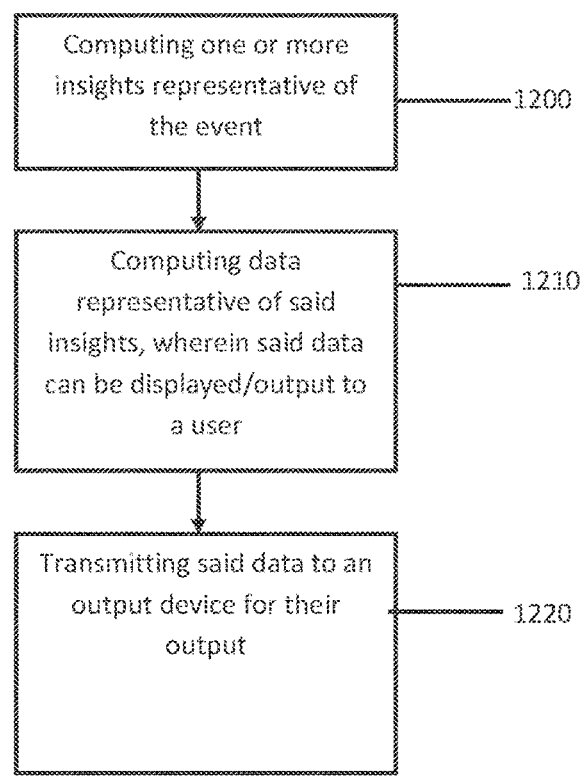
FIG. 12 depicts a method of outputting one or more insights.

Attention is now drawn to FIG. 12, which depicts a method of outputting one or more insights computed using the various embodiments described above.

As shown, the method comprises (operation 1200) determining one or more insights as explained in the various embodiments above.

The insights need now to be output to a user. This output can have various forms: visual display (e.g. text, image, etc.), audio display, multimedia display, etc.

Therefore at operation 1210, data representative of the insights is determined, wherein this data can be output/displayed to a user.

Examples of data which can be output to a user include useful information to fight event spectators or organizers, players (e.g. fighters) and their coaches using any adapted media (e.g. text, artistic representations, on-screen overlays during the broadcasting of an event etc.).

In some embodiments, assume a specific kick or punch has been detected on a given part of the body of the fighter. A corresponding output can be displayed on this given part of the body of the fighter on the screen, which represents parameters of the punch as determined using the various embodiments above (e.g. speed, force, etc.).

At operation 1220, this data is transmitted to an output device TV screen, smartphone, audio speaker, broadcasting center of a TV channel, website, etc.), for outputting this data accordingly.

Figure 13:
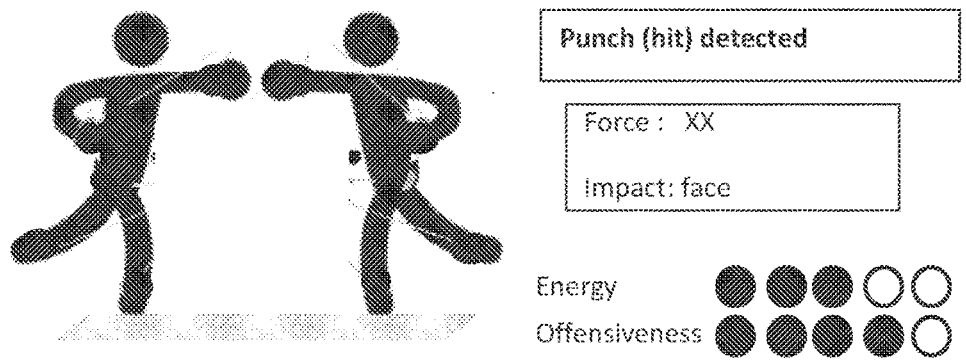
FIG. 13 is an example of the method of FIG. 12 for a martial arts event.

A non-limitative example is provided with reference to FIG. 13. Although this example is provided with respect to a martial arts event, this can be applied similarly to other sports or events.

As shown, a fight is broadcasted on a screen. Data representative of the insights calculated during the fight is superimposed onto the image of the fight (this can be done in some embodiments for live fights, and corresponding data is calculated in real time or quasi real time). For example, in FIG. 13, a punch was detected and identified as a hit. A corresponding alert is provided on a part of the screen, together with parameters of the punch (speed, impact point). In addition, data representative of the energy and offensiveness of a fighter is displayed using an adapted and ergonomic representation (e.g. scale).

Various other insights can be represented and output, not only in martial arts, but also in other sports or other events.

Figure 14:
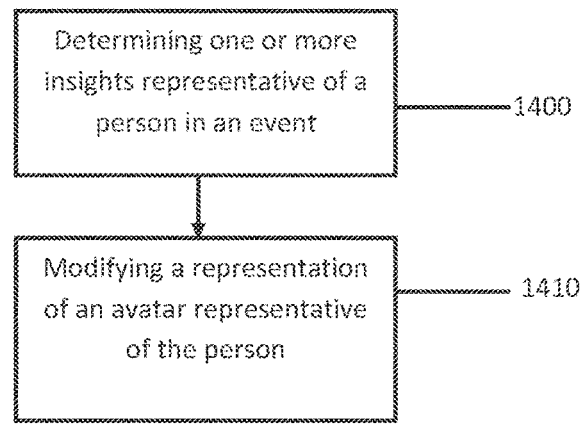
FIG. 14 depicts a method of building an avatar reflecting a person and insights that were determined.

Attention is now drawn to FIG. 14.

According to sonic embodiments, and as described hereafter, various insights (determined as explained in particular with the various embodiments above) can be used to modify an appearance of an avatar (virtual character which is displayed in a simulation, such as a simulation of the event, or a game). This method can be performed using the system of FIG. 1 described earlier in this specification.

Assume behaviour/motion of a person is monitored in an event (e.g. martial arts event) using a plurality of sensors (as explained in FIG. 1). A plurality of insights can be determined (see operation 1400), as already explained above.

An avatar can be built and can be output which represents, at least partially, behaviour/motion of the person.

An avatar corresponds to a graphical representation of a real user. It may take either a three-dimensional form (as in games or virtual worlds), or a two-dimensional form.

According to sonic embodiments, the insights determined for a person of the event can be used to modify, accordingly, an avatar representative of this person (operation 1410). Various embodiments for determining insights have already been described above.

For example, assume a fighter is monitored. A corresponding avatar can mimic the motion of the fighter. The avatar can be displayed on the same screen as the representation of the real fighter, or on another screen, etc. Output of the avatar can be e.g. performed on a screen of a smartphone, on a computer screen, TV screen, etc.

In addition, various insights determined for the person in the event can be reflected in the visual representation of the avatar.

As a non-limitative example, based on the number of punches received by the fighter and the amount of energy spent by the fighter, the avatar can be modified to indicate that the fighter is e.g. tired or hurt.

If two fighters are monitored during an event, then it is possible to provide a simulated fight with two avatars fighting one against the other, wherein this simulated fight is representative of the real fight, with additional effects representative of insights detected in the fight. This simulated fight can e.g. output as an overlay on the real broadcast of the fight, or in a separate screen.

According to some embodiments, one or more sensors are present on a user (or in the environment of the user). Examples of sensors are provided with respect to FIG. 1. An avatar can represent motion of the user, and this avatar can be used in a game. Therefore, the user can play a game with his representative avatar, using the various embodiments described below. In particular, the various effects described below can be applied to this avatar, therefore improving the game experience.

In some embodiments, assume that a person (e.g. fighter) is monitored during one or more events (e.g. fights) and insights representative of this person (e.g. fighter) are determined over time. Based on these insights, it is possible to determine a profile representative of this person (e.g. fighter, in this case the profile can be representative of e.g. average strength, offensiveness, number of punches per fight, etc.)

These properties are used for generating an avatar in software (e.g. in a game, in eGaming, mobile gaming, any entertainment form in the virtual world, any other consumer or fan engagement form, or any IoT solution for entertainment or social media application, or any suitable VR or AR application—virtual or augmented reality) in which the avatar will have properties which are in compliance with the profile determined for this person.

Therefore, in the example of a fighter, a user can play against the avatar of this fighter in a more realistic way, since the avatar represents more precisely the real behaviour and performance of the fighter.

Although an example of a fighter is used in the present description of the avatar, it is to be understood that the avatar can represent other persons, such as an athlete in sports, an artist in entertainment, or a person or star in an event.

According to some embodiments, modification of the avatar is performed in real-time or near real-time.

Figure 15:
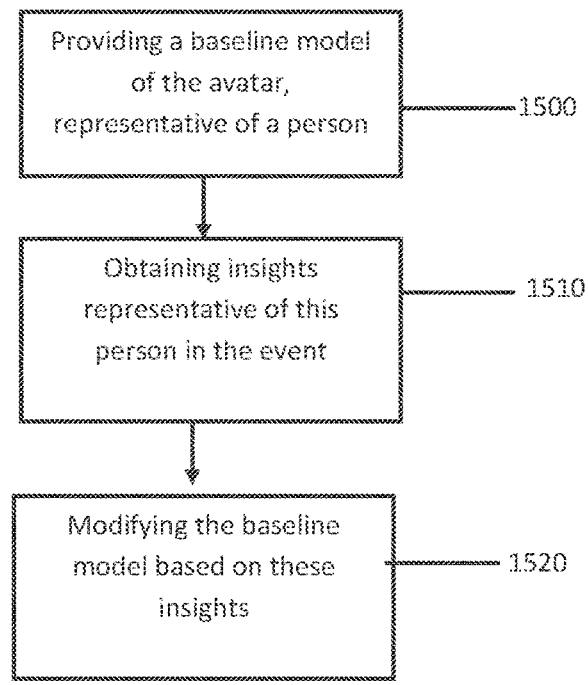
FIG. 15 depicts a possible embodiment of a method in compliance with FIG. 14.

A non-limitative example of a method of determining an avatar representative of a person in an event is provided with reference to FIG. 15.

The method can comprise providing (operation 1500) a baseline model of the avatar. The baseline model represents the baseline for the visual appearance of the subject as an avatar. According to some embodiments, it may comprise a model representing the physical shape and appearance (e.g. colour, reflectance properties) of individual body parts of the user.

The baseline model is not necessarily an exact representation of the body parts of the user. For example, in some embodiments, the baseline model comprises body parts extracted from a database (and which do not reflect the exact shape or appearance of the body parts of the user) and only some body parts of the baseline model reflect the "true" body parts of the user.

According to some embodiments, the baseline model can be obtained for example from a 3D body scan of the user. State of the art technology for creating 3D body models can be used.

According to some embodiments, the baseline model can be a manually created model (using dedicated drawings software). The model is then an artificial virtual representation of the user. As mentioned, the model is not necessarily an exact representation of the user, and at least some parts of the model can be different from the true visual appearance of the user. According to some embodiments, only the head or the face of the baseline model reflects the true aspect of the user, and the body is created based on one or more body models stored in a database.

The method can comprise (operation 1510) obtaining insights representative of the user in the event. Various embodiments have already been described above for obtaining these insights and can be used in this method.

The method can comprise (operation 1520) modifying the baseline model based at on these insights.

Figure 16:
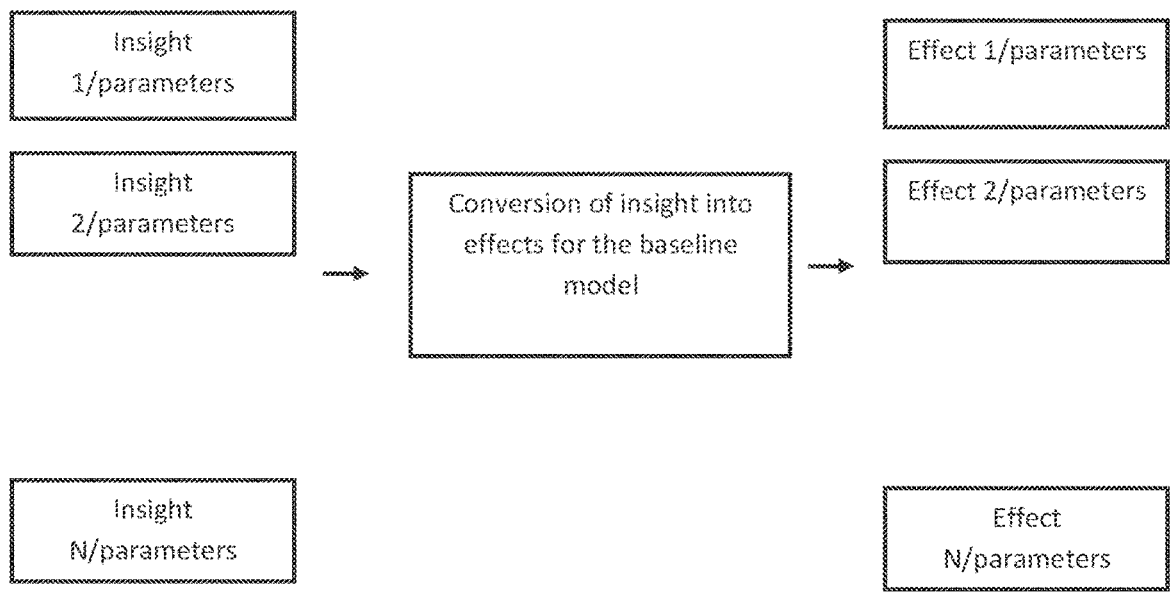
FIG. 16 depicts a possible embodiment of a conversion of insights into multimedia effects for the simulation comprising the avatar.

As shown in FIG. 16, one or more insights can be collected. As already mentioned each insight can comprise one or more parameters (which can describe e.g. the level of the insight, for example, an insight corresponds to a detection of a punch, and a parameter is a speed or location or the punch). Each insight can be converted into one or more representation parameters or effects to be applied to the baseline model. Each effect can be associated with a parameter which defines e.g. intensity of the effect, duration, or other parameters.

This conversion can rely e.g. on predefined rules or functions, which are stored in a memory, and define, for each insight, which effect to be applied. These predefined rules or functions can also define how to reflect parameters of the insights into parameters of the effects.

Non-limitative examples will be provided for martial arts, but this is not limitative and can be applied to other sports or events.

The motion of the baseline model (which can be viewed as an effect to be applied to the baseline model) can be updated based on the motion of the real user (which can be viewed as an insight).

Data collected from video cameras can be used to detect the motion of a user (motion of the user can be detected from this data using an algorithm such as "OpenPose"—this example is not limitative). The baseline model can be modified in order to move (in a simulation) in compliance with the detected motion of the user.

Assume a punch is detected. It can be stored as a predefined rule that a blurring effect has to be applied to the arm of the avatar representing the user who has perforated a punch. The speed of the punch can be detected as already explained above. A function can define a relationship between the estimated punch and parameters of the blurring effect, such as colour of the effect, size of the effect, duration of the effect, etc. For example, the higher the speed, the darker the colour of the blurring effect.

According to some embodiments, the strength detected for a punch can be converted into a transformation of the size of the gloves of the baseline model. The value of the strength defines a corresponding size of the gloves (a predefined relationship can be stored). For example, the higher the strength of the punch, the higher the size of the gloves of the baseline model.

According to some embodiments, an insight is extracted from data representative of a first user (e.g. fighter) but an effect is applied (also or only) to the baseline model representative of a second user. For example, it is detected that a fighter has hit another fighter. Then, an effect can be applied also to the fighter that was hit by the punch.

According to some embodiments, a given insight can be associated with several effects.

Assume as a non-limitative example that an insight indicates that one fighter is more offensive than the other fighter. As a consequence, several multimedia effects can be applied, such as:

- the size of the baseline model of the offensive fighter can be increased relatively to the size of the baseline model of the less offensive fighter;
- the colour of the baseline model of the offensive fighter can be increased; and
- emotions represented on the face of the baseline model of the offensive fighter can be changed (e.g. the offensive fighter can have a happy face, and the less offensive fighter can have a sad face), etc.

This example is however not limitative.

According to some embodiments, a plurality of insights can be associated with a given effect. For example, the given effect is triggered only if a plurality of insights meet a threshold or criteria.

For example, the size of the arm of a baseline model of an avatar is increased (this represents a higher force) only if

- the fighter has performed a number of hitting punches which meet a threshold;
- the average strength of these hitting punches is above a threshold.

As apparent from this example, specific functions can be stored which take as an input one or more insights (with corresponding parameters of the insights), and provide one or more effects to be applied to the baseline model based on these insights (with corresponding parameters of the effects)

According to some embodiments, an effect applied to the baseline model can comprise an animation which evolves over time. In particular, this animation can evolve during the period of time in which the insight is detected.

For example, assume a punch has been detected and that an effect is applied to reflect speed of the punch. Since the speed of the punch can evolve (from the beginning of the punch until the impact of the punch), the effect can evolve accordingly, depending on the detected speed. In some embodiments, at each point in time over several points of time (which depend on the sampling), speed is determined and a corresponding effect (e.g. intensity or colour of the blurting effect can evolve, depending on the detected speed of the punch over time) is applied.

Other examples of effects that can be applied to the baseline model based on the detected insights can include e.g.:
scale of whole body;
scale of body parts;
location and orientation of body parts:
animation templates to be applied to the baseline model (which can include multimedia/visual effects applied to this model, sound effects, etc.).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of monitoring a plurality of persons in an event, the plurality of persons including at least a first person and a second person, the method comprising, by a processing circuitry:
    obtaining first data informative of a position or a motion of at least one part of the first person's body, and second data informative of a position or a motion of at least one part of the second person's body, wherein the first data and the second data are obtained based on measurements of at least one sensor,
    using a plurality of algorithms, wherein each algorithm implements a machine learning model, to monitor the plurality of persons in the event, the using including:
        feeding at least part of the first data and the second data to a first algorithm implementing a trained machine learning model, to determine an event situation, wherein the event situation characterizes a behavior of at least both the first person and the second person in the event,
        responsive to a determination of the event situation as a given event situation, selecting, among the plurality of algorithms, a second algorithm implementing a machine learning model trained with respect to said given event situation, and
        feeding at least part of the first data to the selected second algorithm, to determine an insight characteristic of an action performed by the first person in the event.

2. The method of claim 1, wherein the sensor comprises at least one of:
    a sensor located on a part of a person's body, wherein the person is at least one of the first person or the second person;
    a sensor located on a tool, or item, or piece of clothing carried by a person in the event, wherein the person is at least one of the first person or the second person,
    a sensor located in gloves of a person in the event, wherein the person is at least one of the first person or the second person,
    a video sensor providing an image of a person in the event, wherein the person is at least one of the first person or the second person,
    a pressure sensor located on a ground surface of the event.

3. The method of claim 2, comprising at least one of (i), (ii) or (iii):
    (i) determining said insight comprises determining, based at least on said data, a type of the attack performed by said fighter;
    (ii) determining said insight comprises determining, based at least on said data, whether said attack corresponds to a hit, a missed attack, or a blocked attack; or
    (iii) determining said insight comprises determining, based at least on said data, at least one of a strength of the attack, a speed of the attack and an impact zone of the attack.

4. The method of claim 1, wherein:
    the event is a martial arts event and the first person is a fighter, wherein determining said insight comprises, based at least on said first data, detecting an attack performed by said first fighter, or
    the event is a soccer event and the first person is a player, wherein the method comprises, based at least on said data, determining an insight representative of at least one of tackling, dribbling, shooting and running by said player; or
    the event is a basketball event and the first person is a player, wherein determining said insight comprises, based at least on said data, determining an insight representative of at least one of jumping, dribbling, shooting and running by said player.

5. The method of claim 1, wherein the event is characterizable by a list comprising different event situations, wherein the method comprises, by the processing circuitry, based at least on said first data and second data measured by said sensor, determining an event situation among said list.

6. The method of claim 1, comprising at least one of (i), (ii) or (iii):
    (i) the event is a martial arts event, wherein determining the event situation comprises determining a fight situation among at least one of ground fight, clinch fight and distance fight;
    (ii) the event is a soccer event, wherein determining the event situation comprises, determining a soccer situation among at least one of attack phase, ball holding phase, penalty shots phase; or
    (iii) the event is a basket-ball event, wherein determining the event situation comprises determining a basket-ball situation among at least one of attack phase, ball holding phase, free shots phase.

7. The method of claim 1, comprising, by the processing circuitry, at least one of:
    determining one or more insights over a period of time for said first person, and building, by the processing circuitry, a profile characterizing behavior of said first person based at least on said insights;

determining an insight representative of interactions of at least another person with the first person;

determining an insight indicative of an offensiveness of the first person, determining an insight indicative of an environment of the first person, determining an insight representative of a physical condition of the first person; or determining an insight representative of emotions of the first person.

8. The method of claim 1, further comprising displaying data representative of the insight, thereby providing a visual characterization of at least one of the first person and the event.

9. A system of monitoring a plurality of persons in an event, the plurality of persons including at least a first person and a second person, the system comprising a processing circuitry configured to:

obtain first data informative of a position or a motion of at least one part of the first person's body, and second data informative of a position or a motion of at least one part of the second person's body, wherein the first data and the second data are obtained based on measurements of at least one sensor, use a plurality of algorithms, wherein each algorithm implements a machine learning model, to monitor the plurality of persons in the event, the using including:

feeding at least part of the first data and the second data to a first algorithm implementing a trained machine learning model, to determine an event situation, wherein the event situation characterizes a behavior of at least both the first person and the second person in the event, responsive to a determination of the event situation as a given event situation, selecting, among the plurality of algorithms, a second algorithm implementing a machine learning model trained with respect to said given event situation, and feeding at least part of the first data to the selected second algorithm, to determine an insight characteristic of an action performed by the first person in the event.

10. The system of claim 9, wherein the sensor comprises at least one of:

a sensor located on a part of the person's body, wherein the person is at least one of the first person or the second person;

a sensor located on a tool, or item, or piece of clothing carried by a person in the event, wherein the person is at least one of the first person or the second person;

a sensor located in gloves of a person in the event, wherein the person is at least one of the first person or the second person;

a video sensor providing an image of a person in the event, wherein the person is at least one of the first person or the second person, or a pressure sensor located on a ground surface of the event.

11. The system of claim 9, wherein:

the event is a martial arts event and the first person is a fighter, wherein determining said insight comprises, based at least on said first data, detecting an attack performed by said first fighter, or the event is a soccer event and the first person is a player, wherein the system is configured to determine, based at least on said data, an insight representative of at least one of tackling, dribbling, shooting and running by said player, or the event is a basketball event and the first person is a player, wherein the system is configured to determine, based at least on said data, an insight representative of at least one of jumping, dribbling, shooting or running by said player.

12. The system of claim 9, comprising at least one of (i), (ii) or (iii):

(i) determining said insight comprises determining, based at least on said data, a type of the attack performed by said fighter;

(ii) determining said insight comprises determining, based at least on said data, whether said attack corresponds to a hit, a missed attack, or a blocked attack; or (iii) determining said insight comprises determining, based at least on said data, at least one of a strength of the attack, a speed of the attack and an impact zone of the attack.

13. The system of claim 9, wherein the event is characterizable by a list comprising different event situations, wherein the system is configured to, by the processing circuitry, based at least on said first data and second data measured by said sensor, determine an event situation among said list.

14. The system of claim 9, wherein at least one of (i), (ii) or (iii) is met:

(i) the event is a martial arts event, wherein determining the event situation comprises determining a fight situation among at least one of ground fight, clinch fight and distance fight;

(ii) the event is a soccer event, wherein determining the event situation comprises determining a soccer situation among at least one of attack phase, ball holding phase, penalty shots phase; or (iii) the event is a bask-ball event, wherein determining the event situation comprises determining a soccer situation among at least one of attack phase, ball holding phase, free shots phase.

15. The system of claim 9, configured to determine, by the processing circuitry, at least one of:

one or more insights over a period of time for said first person, and to build, by the processing circuitry, a profile characterizing behavior of said first person based at least on said insights;

an insight representative of interactions of at least another person with the first person;

an insight indicative of an offensiveness of the first person;

an insight indicative of an environment of the first person;

an insight representative of a physical condition of the first person; and/or an insight representative of emotions of the first person.

16. The system of claim 9, configured to display data representative of the insight, thereby providing a visual characterization of at least one of the first person and the event.

17. The system of claim 9, configured to, by a processing circuitry:

provide an avatar representative of the first person in a simulation, animate said avatar in said simulation based at least on a motion of said first person in the event, and modify a visual representation of said avatar or of said simulation based on said at least one insight.

18. The system of claim 17, configured to, by the processing circuitry:
provide a baseline model for said avatar, and
based on a motion of said first person in the event, and on said insight, modify accordingly said baseline model to reflect said motion and said insight, wherein said modifying is based on an algorithm receiving, as an input, at least said insight and one or more parameters of said insight, and which provides, as an output, at least one multimedia effect and associated parameters to be applied at least to said baseline model.

19. The system of claim 9, configured to:
determine one or more insights over a period of time for said first person,
build, by the processing circuitry, a profile characterizing behavior of said first person based on said one or more insights, and
generate an avatar which has parameters which complies with said profile, thereby allowing use of said avatar in a simulation.

20. A non-transitory storage device readable by a machine, tangibly embodying a program of instructions executable by the machine to perform operations of monitoring a plurality of persons in an event, the plurality of persons including at least a first person and a second person, the operations comprising:
obtaining first data informative of a position or a motion of at least one part of the first person's body, and second data informative of a position or a motion of at least one part of the second person's body, wherein the first data and the second data are obtained based on measurements of at least one sensor,
using a plurality of algorithms, wherein each algorithm implements a machine learning model, to monitor the plurality of persons in the event, the using including:
feeding at least part of the first data and the second data to a first algorithm implementing a trained machine learning model, to determine an event situation, wherein the event situation characterizes a behavior of at least both the first person and the second person in the event,
responsive to a determination of the event situation as a given event situation,
selecting, among the plurality of algorithms, a second algorithm implementing a machine learning model trained with respect to said given event situation, and
feeding at least part of the first data to the selected second algorithm, to determine an insight characteristic of an action performed by the first person in the event.

* * * * *

UNITED STATES PATENT AND TRADEMARK OFFICE
CERTIFICATE OF CORRECTION

PATENT NO. : 11,478,681 B2
APPLICATION NO. : 16/767824
DATED : October 25, 2022
INVENTOR(S) : Aleksandr Kantorovich et al.

Page 1 of 5

It is certified that error appears in the above-identified patent and that said Letters Patent is hereby corrected as shown below:

In the Claims

Replace Column 27, Line 39-Column 32, Line 24, (approx.) with the following:
1. A method of monitoring a plurality of persons in an event, the plurality of persons including at least a first person and a second person, the method comprising, by a processing circuitry:
    obtaining first data informative of a position or a motion of at least one part of the first person's body, and second data informative of a position or a motion of at least one part of the second person's body, wherein the first data and the second data are obtained based on measurements of at least one sensor,
    using a plurality of algorithms, wherein each algorithm implements a machine learning model, to monitor the plurality of persons in the event, the using including:
        feeding at least part of the first data and the second data to a first algorithm implementing a trained machine learning model, to determine an event situation, wherein the event situation characterizes a behavior of at least both the first person and the second person in the event,
        responsive to a determination of the event situation as a given event situation, selecting, among the plurality of algorithms, a second algorithm implementing a machine learning model trained with respect to said given event situation, and
        feeding at least part of the first data to the selected second algorithm, to determine an insight characteristic of an action performed by the first person in the event.
2. The method of claim 1, wherein the sensor comprises at least one of:
    a sensor located on a part of a person's body, wherein the person is at least one of the first person or the second person;
    a sensor located on a tool, or item, or piece of clothing carried by a person in the event, wherein the person is at least one of the first person or the second person,
    a sensor located in gloves of a person in the event, wherein the person is at least one of the first person or the second person, Signed and Sealed this
Twenty-first Day of January, 2025

Coke Morgan Stewart
*Acting Director of the United States Patent and Trademark Office* a video sensor providing an image of a person in the event, wherein the person is at least one of the first person or the second person, a pressure sensor located on a ground surface of the event.

3. The method of claim 1, wherein:

the event is a martial arts event and the first person is a fighter, wherein determining said insight comprises, based at least on said first data, detecting an attack performed by said fighter, or the event is a soccer event and the first person is a player, wherein the method comprises, based at least on said data, determining an insight representative of at least one of tackling, dribbling, shooting and running by said player; or the event is a basketball event and the first person is a player, wherein determining said insight comprises, based at least on said data, determining an insight representative of at least one of jumping, dribbling, shooting and running by said player.

4. The method of claim 3, comprising at least one of (i), (ii) or (iii):

(i) determining said insight comprises determining, based at least on said data, a type of the attack performed by said fighter;

(ii) determining said insight comprises determining, based at least on said data, whether said attack corresponds to a hit, a missed attack, or a blocked attack; or (iii) determining said insight comprises determining, based at least on said data, at least one of a strength of the attack, a speed of the attack and an impact zone of the attack.

5. The method of claim 1, wherein the event is characterizable by a list comprising different event situations, wherein the method comprises, by the processing circuitry, based at least on said first data and second data measured by said sensor, determining an event situation among said list.

6. The method of claim 1, comprising at least one of (i), (ii) or (iii):

(i) the event is a martial arts event, wherein determining the event situation comprises determining a fight situation among at least one of ground fight, clinch fight and distance fight;

(ii) the event is a soccer event, wherein determining the event situation comprises, determining a soccer situation among at least one of attack phase, ball holding phase, penalty shots phase; or (iii) the event is a basket-ball event, wherein determining the event situation comprises determining a basket-ball situation among at least one of attack phase, ball holding phase, free shots phase.

7. The method of claim 1, comprising, by the processing circuitry, at least one of:

determining one or more insights over a period of time for said first person, and building, by the processing circuitry, a profile characterizing behavior of said first person based at least on said insights;

determining an insight representative of interactions of at least another person with the first person;

determining an insight indicative of an offensiveness of the first person, determining an insight indicative of an environment of the first person, determining an insight representative of a physical condition of the first person; or determining an insight representative of emotions of the first person.

8. The method of claim 1, further comprising displaying data representative of the insight, thereby providing a visual characterization of at least one of the first person and the event.

9. A system of monitoring a plurality of persons in an event, the plurality of persons including at least a first person and a second person, the system comprising a processing circuitry configured to:
    obtain first data informative of a position or a motion of at least one part of the first person's body, and second data informative of a position or a motion of at least one part of the second person's body, wherein the first data and the second data are obtained based on measurements of at least one sensor,
    use a plurality of algorithms, wherein each algorithm implements a machine learning model, to monitor the plurality of persons in the event, the using including:
        feeding at least part of the first data and the second data to a first algorithm implementing a trained machine learning model, to determine an event situation, wherein the event situation characterizes a behavior of at least both the first person and the second person in the event,
            responsive to a determination of the event situation as a given event situation,
            selecting, among the plurality of algorithms, a second algorithm implementing machine learning model trained with respect to said given event situation, and
            feeding at least part of the first data to the selected second algorithm, to determine an insight characteristic of an action performed by the first person in the event.

10. The system of claim 9, wherein the sensor comprises at least one of:
    a sensor located on a part of the person's body, wherein the person is at least one of the first person or the second person;
    a sensor located on a tool, or item, or piece of clothing carried by a person in the event, wherein the person is at least one of the first person or the second person;
    a sensor located in gloves of a person in the event, wherein the person is at least one of the first person or the second person;
    a video sensor providing an image of a person in the event, wherein the person is at least one of the first person or the second person; or
    a pressure sensor located on a ground surface of the event.

11. The system of claim 9, wherein:
    the event is a martial arts event and the first person is a fighter, wherein determining said insight comprises, based at least on said first data, detecting an attack performed by said first fighter, or
    the event is a soccer event and the first person is a player, wherein the system is configured to determine, based at least on said data, an insight representative of at least one of tackling, dribbling, shooting and running by said player, or
    the event is a basketball event and the first person is a player, wherein the system is configured to determine, based at least on said data, an insight representative of at least one of jumping, dribbling, shooting or running by said player.

12. The system of claim 9, comprising at least one of (i), (ii) or (iii):
    (i) determining said insight comprises determining, based at least on said data, a type of the attack performed by said fighter;
    (ii) determining said insight comprises determining, based at least on said data, whether said attack corresponds to a hit, a missed attack, or a blocked attack; or
    (iii) determining said insight comprises determining, based at least on said data, at least one of a strength of the attack, a speed of the attack and an impact zone of the attack.

13. The system of claim 9, wherein the event is characterizable by a list comprising different event situations, wherein the system is configured to, by the processing circuitry, based at least on said first data and second data measured by said sensor, determine an event situation among said list.

14. The system of claim 9, wherein at least one of (i), (ii) or (iii) is met:
    (i) the event is a martial arts event, wherein determining the event situation comprises determining a fight situation among at least one of ground fight, clinch fight and distance fight;
    (ii) the event is a soccer event, wherein determining the event situation comprises determining a soccer situation among at least one of attack phase, ball holding phase, penalty shots phase; or
    (iii) the event is a bask-ball event, wherein determining the event situation comprises determining a soccer situation among at least one of attack phase, ball holding phase, free shots phase.

15. The system of claim 9, configured to determine, by the processing circuitry, at least one of:
    one or more insights over a period of time for said first person, and to build, by the processing circuitry, a profile characterizing behavior of said first person based at least on said insights;
    an insight representative of interactions of at least another person with the first person;
    an insight indicative of an offensiveness of the first person;
    an insight indicative of an environment of the first person;
    an insight representative of a physical condition of the first person; or
    an insight representative of emotions of the first person.

16. The system of claim 9, configured to display data representative of the insight, thereby providing a visual characterization of at least one of the first person and the event.

17. The system of claim 9, configured to, by a processing circuitry:
    provide an avatar representative of the first person in a simulation,
    animate said avatar in said simulation based at least on a motion of said first person in the event, and
    modify a visual representation of said avatar or of said simulation based on said at least one insight.

18. The system of claim 7, configured to, by the processing circuitry:
    provide a baseline model for said avatar, and
    based on a motion of said first person in the event, and on said insight, modify accordingly said baseline model to reflect said motion and said insight, wherein said modifying is based on an algorithm receiving, as an input, at least said insight and one or more parameters of said insight, and which provides, as an output, at least one multimedia effect and associated parameters to be applied at least to said baseline model.

19. The system of claim 9, configured to:
    determine one or more insights over a period of time for said first person,
    build, by the processing circuitry, a profile characterizing behavior of said first person based on said one or more insights, and
    generate an avatar which has parameters which complies with said profile, thereby allowing use of said avatar in a simulation.

20. A non-transitory storage device readable by a machine, tangibly embodying a program of instructions executable by the machine to perform operations of monitoring a plurality of persons in an event, the plurality of persons including at least a first person and a second person, the operations comprising:

obtaining first data informative of a position or a motion of at least one part of the first person's body, and second data informative of a position or a motion of at least one part of the second person's body, wherein the first data and the second data are obtained based on measurements of at least one sensor, using a plurality of algorithms, wherein each algorithm implements a machine learning model, to monitor the plurality of persons in the event, the using including:

feeding at least part of the first data and the second data to a first algorithm implementing a trained machine learning model, to determine an event situation, wherein the event situation characterizes a behavior of at least both the first person and the second person in the event, responsive to a determination of the event situation as a given event situation, selecting, among the plurality of algorithms, a second algorithm implementing a machine learning model trained with respect to said given event situation, and feeding at least part of the first data to the selected second algorithm, to determine an insight characteristic of an action performed by the first person in the event.